(12) United States Patent
Hirota et al.

(10) Patent No.: US 6,230,520 B1
(45) Date of Patent: *May 15, 2001

(54) PROCESS FOR PREPARATION OF GLASS OPTICAL ELEMENTS

(75) Inventors: Shinichiro Hirota, Fuchu; Ken Uno, Higashiyamato, both of (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,962

(22) Filed: Jul. 17, 1998

(30) Foreign Application Priority Data

Jul. 18, 1997 (JP) .................................................. 9-193874

(51) Int. Cl.$^7$ ....................................................... C03B 11/00
(52) U.S. Cl. .................................. 65/25.1; 65/63; 65/64; 65/102; 65/182.2
(58) Field of Search .............................. 65/25.1, 63, 64, 65/182.2, 29.19, 83, 102, 122, 124

(56) References Cited

U.S. PATENT DOCUMENTS

| | | | | |
|---|---|---|---|---|
| 1,638,593 | * | 8/1927 | Mulholland | 65/25.1 |
| 1,663,925 | * | 3/1928 | Steimer | 65/25.1 |
| 2,805,898 | * | 9/1957 | Willis, Jr. | 406/88 |

(List continued on next page.)

FOREIGN PATENT DOCUMENTS

| | | |
|---|---|---|
| 61-251529 | 11/1986 | (JP) . |
| 61-286232 | 12/1986 | (JP) . |
| 62-27334 | 2/1987 | (JP) . |

(List continued on next page.)

OTHER PUBLICATIONS

Abstract of Japanese 61–251529 A.
Abstract of Japanese 61–286232 A.
Abstract of Japanese 62–27334 A.
Abstract of Japanese 63–45134 A.
Abstract of Japanese 64–72929 A.
Abstract of Japanese 2–14839 A.
Abstract of Japanese 2–16251 A.
Abstract of Japanese 9–12317 A.

*Primary Examiner*—Sean Vincent
(74) *Attorney, Agent, or Firm*—Burns, Doane, Swecker & Mathis, L.L.P.

(57) ABSTRACT

A method disclosed can mold glass optical elements having a good surface precision with a relatively short cycle time even where glass optical elements are manufactured in largely transforming a glass material. This method is, for example, a molding method for glass optical elements including the step of pressing a glass molding material softened by heat until the center thickness of the glass molded article becomes 70% of the center thickness of the glass molding material to produce the glass molded article. The preheat temperature of the mold is set to a temperature that the average of the temperatures around molding surfaces of upper and lower molds constituting the mold is a temperature that the glass molding material indicates a viscosity of X poises; the heating temperature of the glass molding material is set to a temperature that the glass molding material indicates a viscosity of Y poises; the viscosity X and the viscosity Y satisfy the following formulas.

$\log X < 10$ $\log Y \geq 6.5$ $Y < X$ $-\log X + 14.5 \leq \log Y \leq -\log X + 18$

37 Claims, 12 Drawing Sheets

U.S. PATENT DOCUMENTS

| | | | | |
|---|---|---|---|---|
| 2,911,669 | * | 11/1959 | Beckwith | 264/15 |
| 3,264,720 | * | 8/1966 | Mott | 65/182.2 |
| 4,629,489 | * | 12/1986 | Hirota et al. | 65/102 |
| 4,778,505 | * | 10/1988 | Hirota et al. | 65/102 |
| 5,171,347 | * | 12/1992 | Monji et al. | 65/64 |
| 5,228,894 | * | 7/1993 | Sato et al. | 65/102 |
| 5,250,099 | * | 10/1993 | Kubo et al. | 65/102 |
| 5,284,501 | * | 2/1994 | Monji et al. | 65/32.5 |
| 5,344,476 | * | 9/1994 | Tomida | 65/102 |
| 5,346,522 | * | 9/1994 | Komiyama et al. | 65/64 |
| 5,516,468 | | 5/1996 | Lipscomb et al. | 264/1.38 |
| 5,604,549 | | 2/1997 | Mashiga et al. | 351/177 |
| 5,630,859 | | 5/1997 | Takagi et al. | 65/102 |
| 5,643,504 | | 7/1997 | Chiba | 264/1.7 |
| 5,718,850 | | 2/1998 | Takano et al. | 264/2.4 |
| 5,720,791 | | 2/1998 | Miyuara | 65/37 |
| 5,766,294 | | 6/1998 | Takagi et al. | 65/102 |
| 5,782,946 | | 9/1998 | Komiyama et al. | 65/102 |

FOREIGN PATENT DOCUMENTS

| | | |
|---|---|---|
| 63-45134 | 2/1988 | (JP) . |
| 64-72929 | 3/1989 | (JP) . |
| 2-14839 | 1/1990 | (JP) . |
| 2-16251 | 1/1990 | (JP) . |
| 9-12317 | 1/1997 | (JP) . |

* cited by examiner

PROCESS FOR PREPARATION OF GLASS OPTICAL ELEMENTS

TECHNICAL FIELD TO WHICH THE INVENTION BELONGS

This invention relates to a method for manufacturing glass optical elements such as glass lenses by press-molding a glass material. Particularly, this invention relates to a molding method for obtaining glass optical elements having good optical property without polishing or grinding the pressed material with a relatively high production speed even where press-molding has to largely transform the glass material shaped differently from glass optical elements as the final product.

BACKGROUND OF THE INVENTION

Various manufacturing methods for glass optical elements have been known in which a glass preform as a glass material to be molded is press-molded with a mold guaranteeing surface precision and surface roughness necessary for molded glass article surface where grinding or polishing after press-molding is made unnecessary.

For example, methods as set forth in Japanese Unexamined Patent Publication, No. Showa 64-72,929 or Japanese Patent Publication, No. Heisei 2-16,251 are methods in which molds and glass preforms are heated together. That is, a glass preform is inserted in a mold constituted of an upper mold, a lower mold, and guide molds for guiding them and is press-molded after heated with the mold up to a temperature that the glass preform is adequately softened. The molded preform is then cooled down to about the glass transition point with a cooling rate such that the surface precision of the molded glass article at the post molding stage would not be impaired (or cooled down to around a room temperature in spending a certain time subsequently), and thereafter, the molded glass article is removed from the mold.

In a method, as described above, in which a glass preform is heated, molded, and cooled together with the mold while the glass preform is held in the mold, the temperatures of the glass and the mold are always almost equal to each other, and as the pressing process proceeds, the temperature difference between the surface and inside of the glass is minimized, thereby hardly producing sink marks and thereby offering a stable surface precision. However, this method has a demerit that the cycle time for the entire processes becomes considerably longer because it requires a period for increasing temperature before the pressing starts and a period for decreasing temperature before the article is removed after pressing. Moreover, since the glass and the mold surface contact to each other for a long time from the heating process to the pressing process, reactions tend to occur between the glass and the mold, thereby shortening the life period of the mold.

A method has been known in which a glass preform softened in advance is inserted in a mold separately heated and can renders grinding and polishing after press-molding unnecessary (e.g., Japanese Unexamined Patent Publication No. Showa 61-251,529, Japanese Unexamined Patent Publication No. Showa 61-286,232, Japanese Unexamined Patent Publication No. Showa 62-27,334, Japanese Unexamined Patent Publication No. Showa 63-45,134). With this method, also used is a mold guaranteeing surface precision and surface roughness necessary for molded glass article surface.

The method in which a glass preform softened by heat is press-molded with a preheated mold has an advantage that the method can make the press time shorter. The method also can make the temperature of the mold relatively lower, and because mold releasing is possible after a certain time passes after pressing for cooling the glass temperature, the method can largely shorten the cycle time.

However, this method could not mold the glass as to have a desired shape when the glass material is required to be transformed largely. That is, this method normally uses a mold held at a relatively lower temperature to shorten the cycle time. The glass material may therefore be solidified when cooled, before the glass material is press-molded to have a desired thickness. As a result, this method raised a problem that some molded glass articles obtained by largely transforming the glass material such as, particularly, bi-convex lenses having a thin edge thickness (about 0.8 to 1.3 mm), meniscus lenses, and concave lenses could not be obtained stably. This method also raised a similar problem caused by a large amount of transformation where a spherical glass material is molded. This method also had disadvantages that sink marks or distortions in a material shape may occur easily and satisfactory surface precision is hardly obtainable. In other words, there was a problem that configuration transferability is inadequate.

Particularly, when the glass preform is manufactured by a hot-molding method, the glass preform normally has a shape of a sphere or a slightly flatted sphere or echinus shape, which is not close to the final products. To transform such a glass preform to a desired shape, because the glass preform needs to be largely transformed, such a glass preform also raised the above problem.

It is an object of the invention to provide a method for manufacturing glass optical elements, which can mold the elements in a relatively short cycle time nearly the same as that of conventional methods, can produce stably glass molded articles with good surface precision, even where the glass optical elements are manufactured by largely transforming a glass material in a case such that a glass material having a shape largely different from the shape of the final product is used.

The inventors diligently conducted researches to solve above-described problems in the prior art. They consequently have discovered that, when press-molding of glass optical elements is made, the glass optical elements can be manufactured with good surface precision where the cycle time of the press-molding process is maintained in a short period, by press-fabrication upon preheating the glass material in keeping the temperature (viscosity) of the glass material and the temperature of the mold to have a constant relation. The inventors further perfected the invention upon finding that a glass molded article is obtainable with very good surface precision by pressing the material until the center thickness becomes 70% or less where the glass material is press-molded under the above temperature condition.

SUMMARY OF THE INVENTION

To solve the above problems, this invention can be the following four manufacturing methods.

The first method is a method for manufacturing glass optical elements, including a step of forming a glass molded article by press-molding a glass molding material softened by heat with a mold constituted of an upper mold and a lower mold until a center thickness of the glass molded article becomes 70% or less of the center thickness of the glass molding material, said method further comprising steps of:

softening the glass molding material by heat to a temperature that the glass molding material indicates a viscosity of Y poises; and press-molding the glass molding material softened by heat in introducing the softened glass molding material into the mold such that the average temperature of respective molding surfaces of the upper and lower molds is adjusted to a temperature that the glass molding material indicates a viscosity of X poises, wherein the viscosities of X and Y satisfy the following formulas.

$\log X < 10$ $\log Y \geq 6.5$ $Y < X$ $-\log X + 14.5 \leq \log Y \leq -\log X + 18$ The second method is a method for manufacturing glass optical elements, including a step of forming a glass molded article by press-molding a spherical glass molding material softened by heat with a mold constituted of an upper mold and a lower mold, said method further comprising steps of:

softening the glass molding material by heat to a temperature that the glass molding material indicates a viscosity of Y poises; and press-molding the glass molding material softened by heat in introducing the softened glass molding material into the mold such that the average temperature of respective molding surfaces of the upper and lower molds is adjusted to a temperature that the glass molding material indicates a viscosity of X poises, wherein the viscosities of X and Y satisfy the following formulas.

$\log X < 10$ $\log Y \geq 6.5$ $Y < X$ $-\log X + 14.5 \leq \log Y \leq -\log X + 18$ The third method is a method for manufacturing glass optical elements, including a step of forming a glass molded article by press-molding a spherical glass molding material softened by heat with a mold constituted of an upper mold and a lower mold, said method characterized in that the press-molding starts when, where the glass molding material is held at a temperature that the glass molding material indicates a viscosity of Y poises and where the average temperature of respective molding surfaces of the upper and lower molds is a temperature that the glass molding material indicates a viscosity of X poises, the viscosities of X and Y satisfy the following formulas.

$\log X < 10$ $\log Y \geq 6.5$ (provided that if $9.0 \leq \log X < 10$, $\log Y > 7.0$)

$Y < X$ $-\log X + 14.5 \leq \log Y \leq \log X + 18$

The fourth method is a method for manufacturing glass optical elements, including a step of forming a glass molded article by press-molding a glass molding material softened by heat with a mold constituted of an upper mold and a lower mold, said method characterized in that the press-molding starts when, where the glass molding material is held at a temperature that the glass molding material indicates a viscosity of Y poises and where the average temperature of respective molding surfaces of the upper and lower molds is a temperature that the glass molding material indicates a viscosity of X poises, the viscosities of X and Y satisfy the following formulas.

$\log X < 9$ $\log Y \geq 6.5$ $Y < X$ $\log Y \geq -\log X + 14.5$

In this invention, for above methods for manufacturing glass optical elements, a method for manufacturing glass optical elements in which the glass molding material is softened by heat while floated by gas stream can be used.

DETAILED DESCRIPTION OF THE INVENTION

Figure 1:
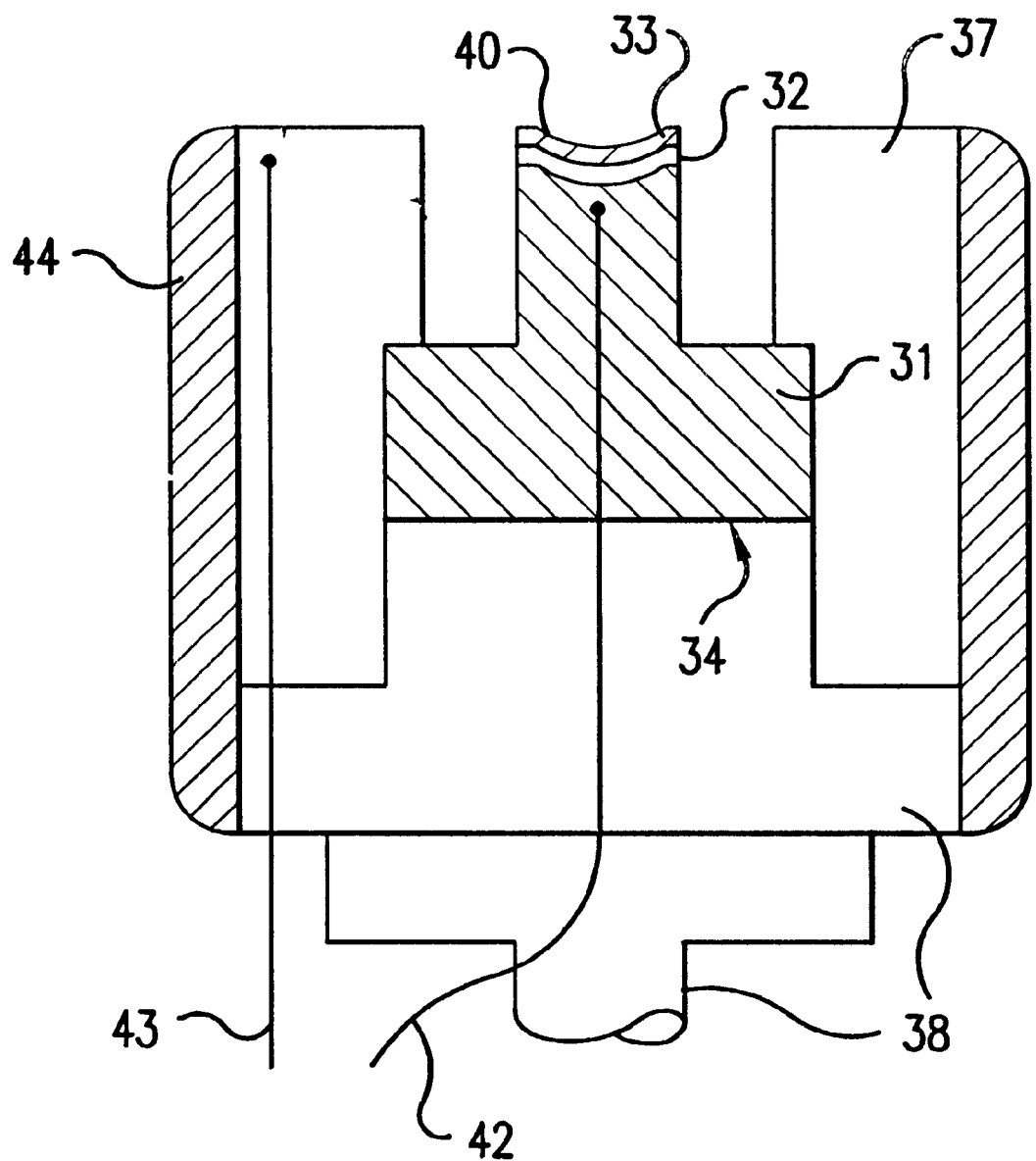
FIG. 1 is a schematic illustration showing a lower mold of a mold used for this invention.

Hereinafter, embodiments according to the invention are described.

This invention is a method for molding glass optical elements by press-molding with a preheated mold a glass molding material softened by heat. The kind and shape of the glass constituting the glass material is known previously. The glass material is, for example, a glass preform or glass gob. The term "glass preform" means a product molding in a prescribed shape used for a preform when glass optical elements are molded. The glass preform can be made by molding such as cold molding or hot molding of melting glass or polishing of those molded as to have a mirror surface. The surface can be not only a mirror surface but also a rough surface, and for example, a ground article ground by a #800 diamond can be used as a glass preform.

The shape of the glass preform is determined in consideration of size and capacity of the glass optical elements as the final products, change amount when molded, etc. With the first method, to obtain a molded article having a good surface precision, a center thickness of the final product is selected to have 70% of the center thickness of the glass molding material such as a glass preform. The rate of the center thickness to the center thickness of the glass molding material is preferably set to 50% or less, from a viewpoint for obtaining molded articles having a better surface precision, and more preferably set to 40% or less.

To obtain a molded article having a good surface precision, it is preferable ideally to use a preform having a shape close to that of the final product and to reduce the change amount by a higher viscosity. However, a preform close to the shape of the final products cannot practically be produced due to high costs. In this invention, therefore, a molded article having a good surface precision is obtained by setting the change amount of some degree or more as described above even where a preform is not close to the shape of the final products.

To prevent any gas trap from occurring during molding, it is preferable to make the glass preform have a shape as to first contact the center of the molding surface with the molding surface of the preform. The shape of the glass preform is, e.g., a spherical shape, slightly eccentric sphere or echinus shape, disc shape, square or rectangular shape, etc., and a spherical shape generally has the largest change amount when the preform is molded.

Meanwhile, the glass gob is a glass piece in which melted glass is divided into a prescribed amount and ordinarily has an irregular shape such as wrinkles or the like.

The preform is made by hot or cold molding to further have a prescribed shape from such a glass gob, or made by hot molding from a melting glass directly to a spherical shape, slightly eccentric sphere or echinus shape, disc shape, square or rectangular shape, etc. As the molding method in such a case, a method dropping a melting glass in a droplet form and solidifying the glass while falling, and a method cooling the glass upon molding the glass into a spherical or echinus shape while the melting glass is floated by gas stream are exemplified.

A spherical preform is preferred from a point that such a preform can be made without surface defects because the preform can be molded by dropping a melting glass in a droplet form or by floating the glass by gas.

However, when the preform is spherical, not only the preform is subject to a large transformation degree in the thickness at a press-molding stage, but also subject to a large expansion degree in the width direction. Therefore, optical elements are obtainable using the second or third method of the invention.

With the invented manufacturing method, a glass lump obtained from a melting glass lump produced without cooling back to a room temperature from a melting glass can be used as a glass molding material. Such a glass lump can be produced, more specifically, by forming individual glass lumps from a melting glass successively supplied from an outlet pipe. As such a producing method, a method set forth in, e.g., Japanese Unexamined Patent Publication No. 9-12, 317 is used. The glass lump is preferably formed in a spherical or echinus (or slightly flatted sphere) shape.

The following three way methods are preferable as a method for forming individual glass lumps.

(1) A method for obtaining glass lumps having a prescribed weight by naturally cutting a flow of melting glass by the weight of the glass and surface tension before the melting glass flowing down from an outlet pipe reaches a receiving mold or while reaching the receiving mold.

(2) A method for obtaining glass lumps having a prescribed weight by compulsively cutting a melting glass flow by gas pressure of gas stream before the melting glass flowing down from an outlet pipe reaches a receiving mold or while reaching the receiving mold.

(3) A method for obtaining glass lumps having a prescribed weight by cutting a melting glass flow by, after the melting glass flowing down from an outlet pipe reaches a receiving mold, quickly lowering the receiving mold.

The feature of the methods (1) and (2) is in not cutting by shears. According to the methods (1) to (3), there are advantages that cutting defects by shears, such as bubbles or folded ridges in the melting glass lumps, would not occur.

The temperature of the melting glass is determined properly in consideration of viscosity of the melting glass flowing down from the outlet pipe. The viscosity of the melting glass flowing down is properly in a range of 5 to 50 poises in consideration of the diameter of the outlet pipe, stability of the glass, surface tension of the glass, roping, and so on. The temperature that the glass indicates the viscosity of the above range is, though may vary depending on types of the glass, for example, in a range of 800 to 1000° C.

The weight of the individual melting glass lump is properly determined according to the size of the glass optical elements as the final products.

The kind of the glass used is also properly determined in consideration with the functions and characteristics required for the glass optical elements as the final products.

The melting glass lumps falling in a droplet form or flowing down, produced by one of the above methods, are received by airflow blown out from a lower side, and the glass lumps received by the airflow is held as floating.

A receiving mold set forth in, e.g., Japanese Unexamined Patent Publication Heisei No. 2-14,839 can be used for such receiving and holding as floating the lumps.

The receiving mold has a recess for receiving and floating the glass lumps, and the recess has one or more air outlets to float the glass lump.

With this invention, a mold in Japanese Unexamined Patent Publication Heisei No. 2-14,839 can be used upon improvement. That is, the improved receiving mold incorporates a closed space by the glass lump and an opening below the glass lump in the opening. The glass lump can be floated in the opening in the space by airflow blown from fine holes to the lower side of the lump. Such a closed space offers good floating state. When airflow is concentrated to a lower center of the glass lump, the lower center area may have an indentation when the glass is made having a low viscosity during a process for adjusting temperature. By blowing gas from multiple fine holes, the glass lump can be floated without forming any indentation on the glass lump by concentration at the lower center of the glass lump.

The glass lump is held in a non-contact state by blowing gas in the recess of the receiving mold.

Furthermore, the glass lump can be floated in rotating by giving directionality to the airflow.

The shape of the glass lump can be transformed to a desired shape by controlling the rotation direction and rotation speed of the softened glass lump. When the glass lump is rotated in a horizontal direction, the rotation improves the degree of the true circle, and when the glass lump is rotated in a vertical direction, the rotation improves the degree of the true sphere.

The gas used for floating the glass lump is preferably selected in consideration with prevention of impairments in a floating softening apparatus and a molding apparatus for the glass lumps. As a gas having such property, hardly reactive or inert gas, and a non-oxidizing gas such as a nitrogen can be exemplified. A small amount of a reducing gas such as hydrogen gas can be added to the nitrogen gas or the like. Moreover, air can be used where the material constituting the floating softening apparatus is selected from a material forming an oxide film or an oxide.

The flow amount of the airflow may be changed in consideration with the shape of the orifice of the airflow outlet, the shape and weight of the glass lump, and so on. In an ordinary situation, a gas flow amount suitable for floating the glass lump is in a range of 0.005 to 20 liters / min. If the gas flow is less than 0.005 liters / min, the glass lump may not be floated adequately where the glass lump has a weight of 300 mg or more. If the gas flow is more than 20 liters / min, the glass lump may be transformed into an unexpected shape during heating due to large swings of the glass over the floating softening apparatus even where the glass has weight of 2000 mg or more.

The material for the floating apparatus is not limited as far as having a heat resistance of a degree such that the glass lump would not be suffered from defects or impairments even if the glass is in contact with the material. For example, silicon, silicon carbide, silicon nitride, tungsten carbide, aluminum oxide, titanium nitride, titanium carbide, zirconium oxide, various cermets, carbon, stainless steel, quarts glass, glass, and various refractory metals, etc. may be used.

It is very difficult in an ordinary method to prevent the glass and the apparatus for holding the glass lump from adhering to each other during heating in a low viscosity area such that the glass lump is transformed by weight of the lump. With this invention, the gas is blown out of an inside of the floating apparatus to float the glass lump by the airflow, thereby forming a gas layer between the surface of the apparatus and the surface of the glass, and consequently, the glass lump can be produced from the melting glass without making the floating apparatus react with the glass. When the glass lump is rotated, the glass lump can be floated more stably. This invention can render the glass lump softened by heat in maintaining the shape of the glass lump and also transformed into a desired shape.

It is to be noted that although floating by airflow may properly modify the shape and eliminate surface defects even where the surface of the glass lump has surface defects such as wrinkles, bubbles and shear marks as folded ridges cannot be eliminated even where the glass is heated at a considerably high temperature.

In the manufacturing method according to the invention, the mold and the glass molding material are required to be molded upon preheating them in advance as to keep the temperature of the mold and the temperature (viscosity) of the glass molding material a constant relation when molded. That is, the first and second methods includes steps of softening the glass molding material by heat to a temperature that the glass molding material indicates a viscosity of Y poises, and press-molding the glass molding material softened by heat in introducing the softened glass molding material into the mold such that the average temperature of respective molding surfaces of the upper and lower molds is adjusted to a temperature that the glass molding material indicates a viscosity of X poises. It is so adjusted that the viscosities of X and Y satisfy the following formulas. In the third method of this invention, the press-molding starts when, where the glass molding material is held at a temperature that the glass molding material indicates a viscosity of Y poises and where the average temperature of respective molding surfaces of the upper and lower molds is a temperature that the glass molding material indicates a viscosity of X poises, the viscosities of X and Y satisfy the following formulas.

$\log X < 10$ $\log Y \geq 6.5$ $Y < X$ $-\log X + 14.5 \leq \log Y \leq -\log X + 18$, provided that if $9.0 \leq \log X < 10$, $\log Y > 7.0$ in the third method of the invention.

In the fourth method of the invention, the press-molding starts when, where the glass molding material is held at a temperature that the glass molding material indicates a viscosity of Y poises and where the average temperature of respective molding surfaces of the upper and lower molds is a temperature that the glass molding material indicates a viscosity of X poises, the viscosities of X and Y satisfy the following formulas.

$\log X < 9$ $\log Y \geq 6.5$ $Y < X$ $\log Y \geq -\log X + 14.5$

Figure 4:
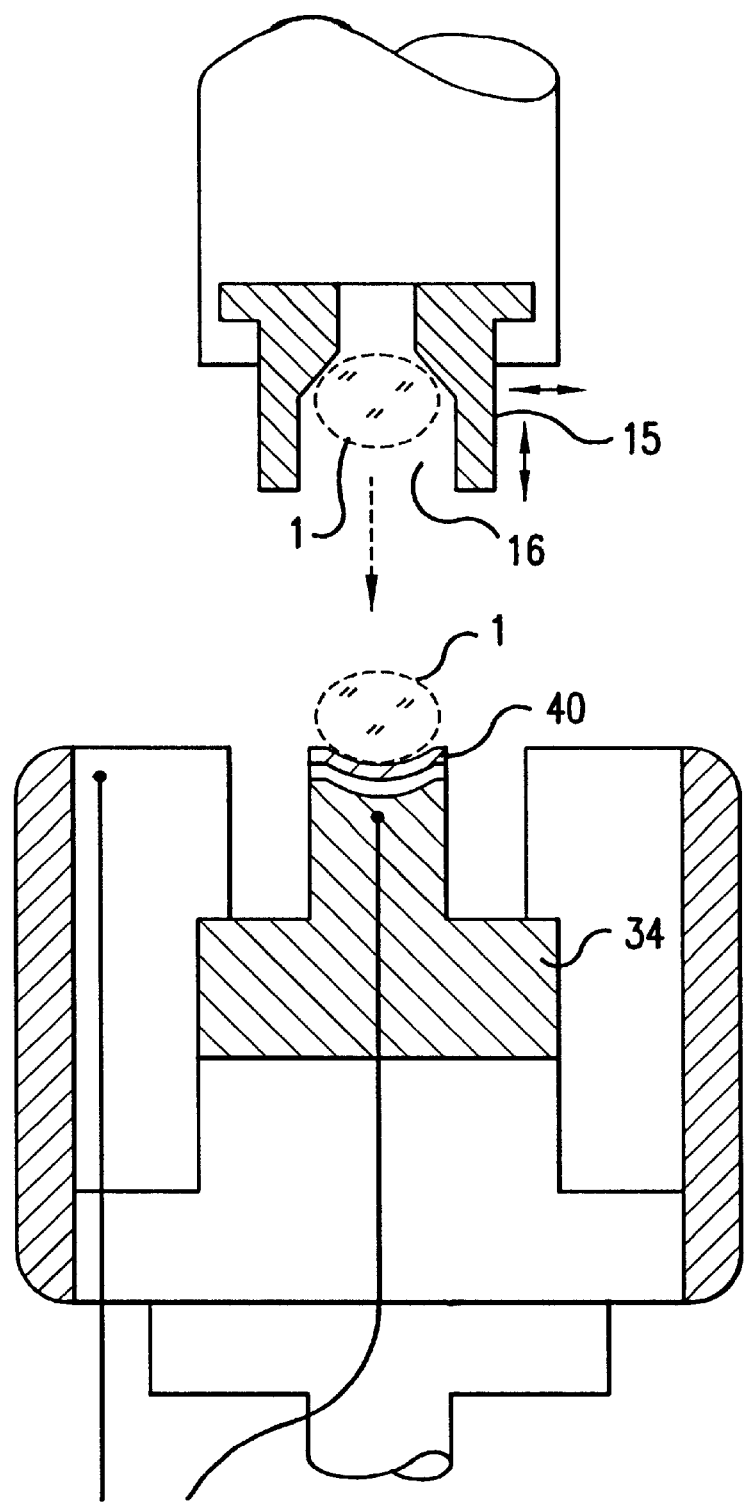
FIG. 4 is a schematic illustration showing a method for transferring the softened glass preform to a mold.
Figure 8:
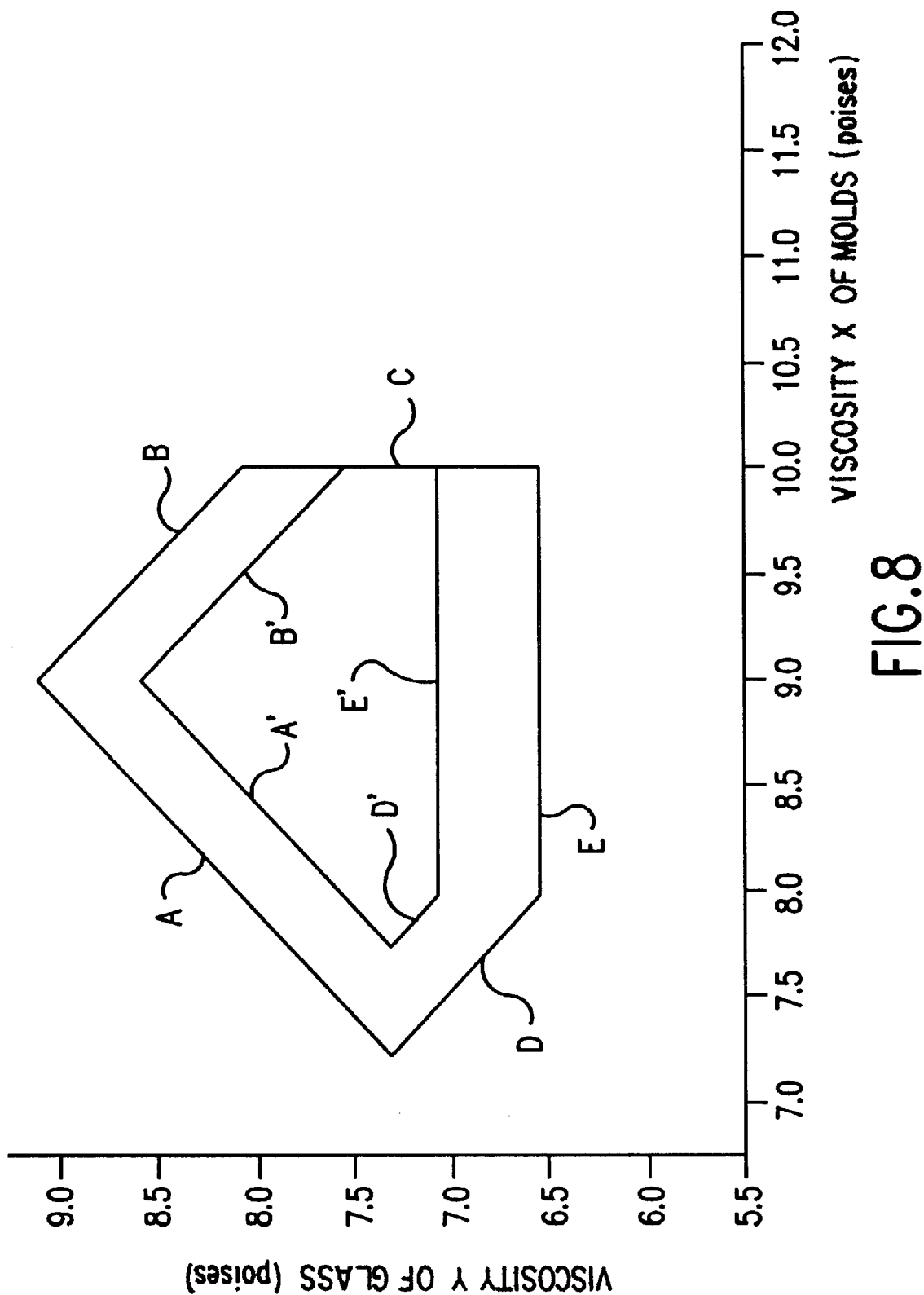
FIG. 8 is a graph for explaining a first method according to the invention.
Figure 9:
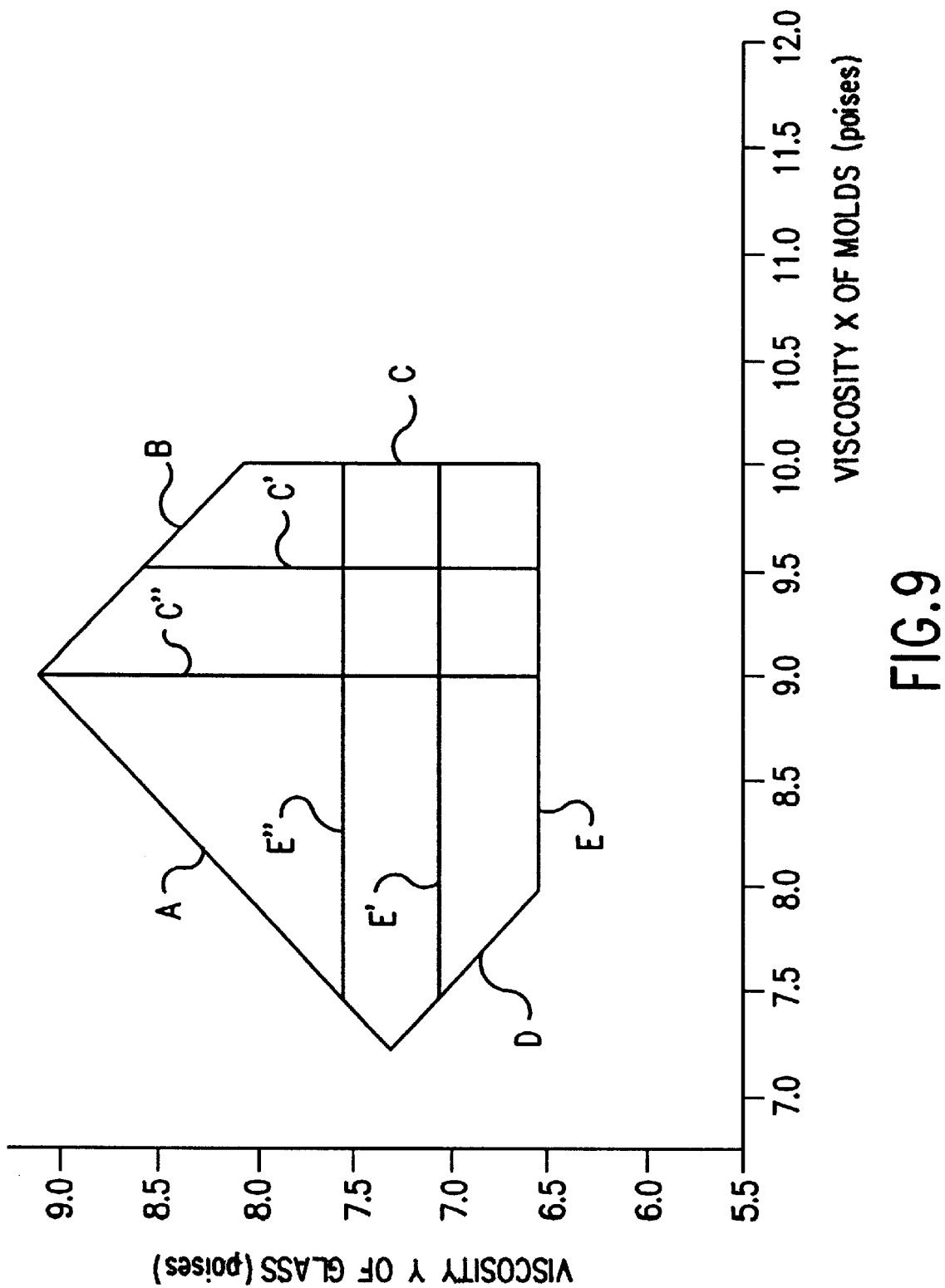
FIG. 9 is a graph for explaining a first method according to the invention.
Figure 10:
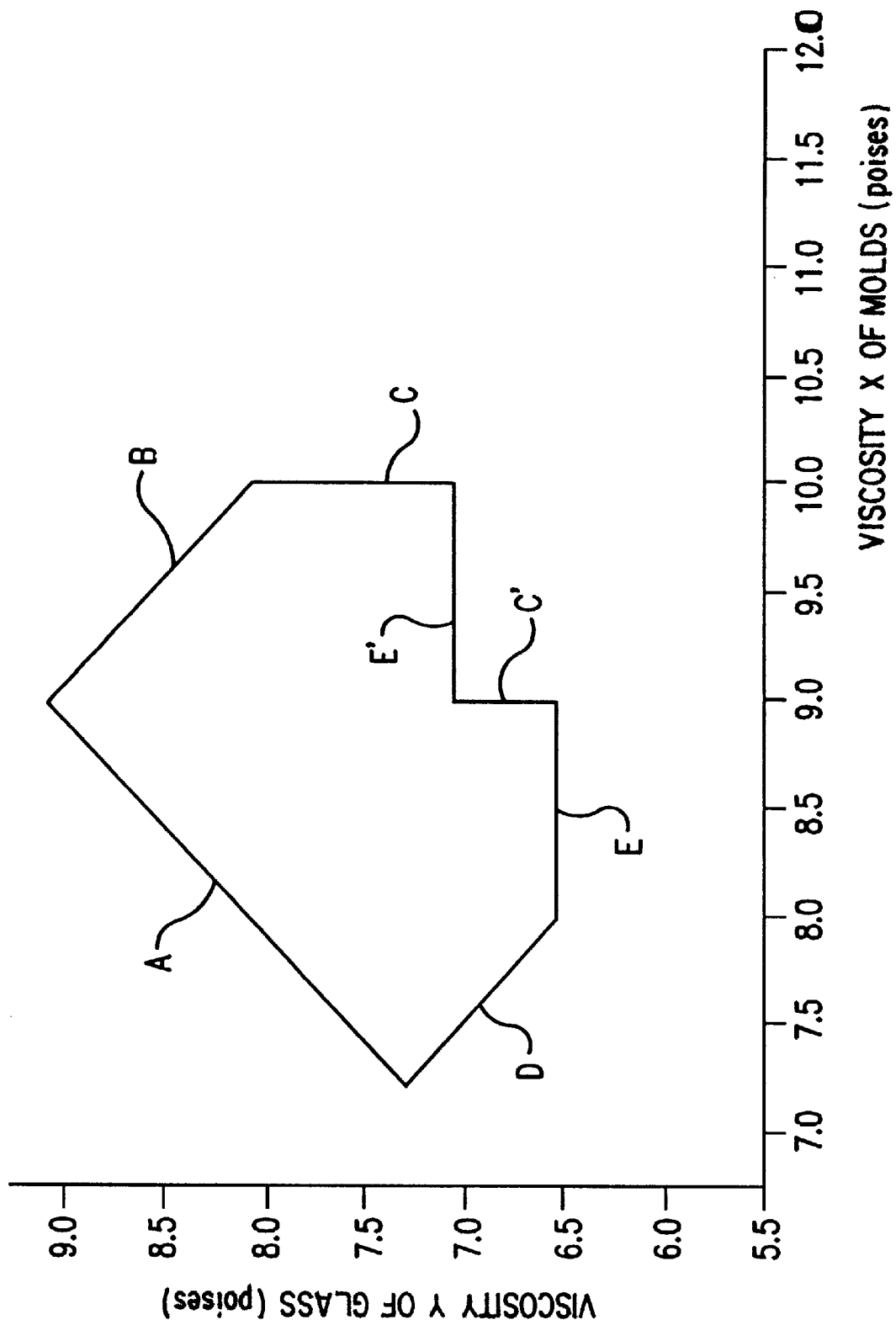
FIG. 10 is a graph for explaining a first method according to the invention.

Referring to FIG. 8 (the first method), FIG. 9 (the second method), FIG. 10 (the third method), and FIG. 4 (the fourth method), relation between X and Y and relation between the average temperature of the mold and the temperature of the glass molding material are described respectively. In each figure, the temperatures of the mold and the glass molding material are indicated in forms of common logarithms of the viscosity (poises) of the corresponding glass molding material. In this specification, as a temperature of the molding surface of the upper mold and a temperature of the molding surface of the lower mold, temperatures inside the upper and lower molds at a depth of around 1 or 2 mm from the molding surface are applicable. Such a temperature at that point is measurable and is the substantial approximation of the temperature of the molding surface.

The temperature of the mold is the average temperature of the respective molding surface where the molding surfaces of the upper mold and the lower mold have temperature profiles. At this situation, the average of the temperatures of two points, around the center and the periphery, of the molding surface may be applicable for the average temperature.

In this invention, it is required to perform press-molding by setting the average temperature of the temperatures of the molding surfaces of the upper mold and the lower mold to a prescribed temperature range (range satisfying the above formulas). If the average temperature of the molding surfaces of the upper and the lower molds is within a prescribed temperature range, upper or lower mold or upper and lower molds can be out of the prescribed temperature range.

Referring to FIG. 8, the first method is described as follows.

(1) During molding, if the temperature of the mold becomes the temperature of the glass molding material or more, the cycle time of molding becomes longer, and the life of the mold is shortened. To shorten the cycle time of molding, it is necessary that the temperature of the mold is set lower than the temperature of the glass molding material. When relation between the temperature of the glass molding material and the temperature of the mold is indicated on the basis of viscosity of the corresponding glass molding material, Y (viscosity corresponding to the temperature of the glass molding material)>X (viscosity of the glass molding material corresponding to the temperature of the mold) (lower side of Line A in FIG. 8). Moreover, it is preferable to set the temperature of the mold 10° C. or more lower than the temperature of the glass molding material, and when indicated upon converted to the corresponding viscosity of the glass molding material, it is an area below Line A' in FIG. 8.

(2) If the glass molding material has a very high viscosity, or in other words, it is subject to a low temperature, expansion of the glass molding material when pressed becomes inadequate, so that a product having a center thickness 70% or below of that of the glass molding material cannot be obtained. To gain adequate expansion of the glass molding material, therefore, it is required that the temperatures of the glass molding material and the mold are high temperatures to some extent. When relation between a suitable temperature of the glass molding material and a suitable temperature of the mold for satisfying this requirement is indicated on the basis of a common logarithm of viscosity of the corresponding glass molding material, it is log X+log Y≦18 (lower side of Line B in FIG. 8). To gain the most suitable expansion of the glass molding material, it is preferable that log X+log Y≦17.5 (lower side of Line B' in FIG. 8).

(3) If the temperature of the mold is too low, expansion of the glass molding material becomes worse. The preheat temperature of the mold is required to be higher than a temperature that the viscosity of the glass molding material indicates $10^{10}$ poises, and when indicated on the basis of logarithm, log X<10 (left side of Line C in FIG. 8).

(4) If the temperatures of the glass molding material and the mold become too high, the glass molding material becomes too soft and expanded too much, thereby making difficult thickness control at the secondary pressing. The glass molding material also easily adheres to the mold, so that the mold is easily inflicted with damages to shorten the life of the mold. It is therefore required to set the glass molding material and the mold at a prescribed temperature or lower. When this temperature relation is indicated on the basis of a common logarithm of viscosity of the glass molding material, it is log X+log Y≧14.5 (upper side of Line D in FIG. 8). Moreover, it is more preferable that the temperature relation between the glass molding material and the mold is log X+log Y≧15 (upper side of Line D' in FIG. 8).

(5) Even where the mold is at a low temperature to some extent, if the glass molding material itself is at a temperature too high, it makes difficult transformation of the glass molding material when softened by heat in advance and holding of the glass molding material. For example, when the glass molding material is softened by floating, transformation in a floating dish becomes too large, or the glass molding material cannot be floated adequately, so that the glass molded article remains contact scars created in contact with the floating dish. Therefore, the temperature of the glass molding material is required to be lower than a temperature that its viscosity indicates $10^{6.5}$ poises, and it is log Y≧6.5 (upper side of Line E in FIG. 8). It is more favorable if log Y≧7 (upper side of Line E' in FIG. 8).

According to the above description, in the first method of the invention, when the average temperature of the temperature around the molding surface of the upper mold and the temperature around the molding surface of the lower mold of the mold and the temperature of the glass molding material are indicated on the basis of logarithm of viscosity (poises) of the corresponding glass molding material, it is required to be in an area enclosed by Lines A, B, C, C', D, E and F in FIG. 10.

This invention is applicable not only to methods (first and second methods) in which the glass molding material is introduced into the mold after the mold and the glass molding material are pressed at a prescribed temperature but also to methods (third and fourth methods) in which the mold and the glass molding material are heated at a prescribed temperature after introduction. With the third method, if 6.5≦log Y≦7 5 (lower side of E' in FIG. 10) and 9.0≦log X≦10.0 (right side of C' in FIG. 10) while the mold and the glass molding material are in contact with each other (or namely, where the glass molding material is introduced in the mold), local temperature differences between the mold and the glass molding material become too large to bring optical elements having a desired surface precision (since the contact portions anywhere in the mold and the glass molding material are at the same temperature), so that this temperature area is excluded.

Figure 11:
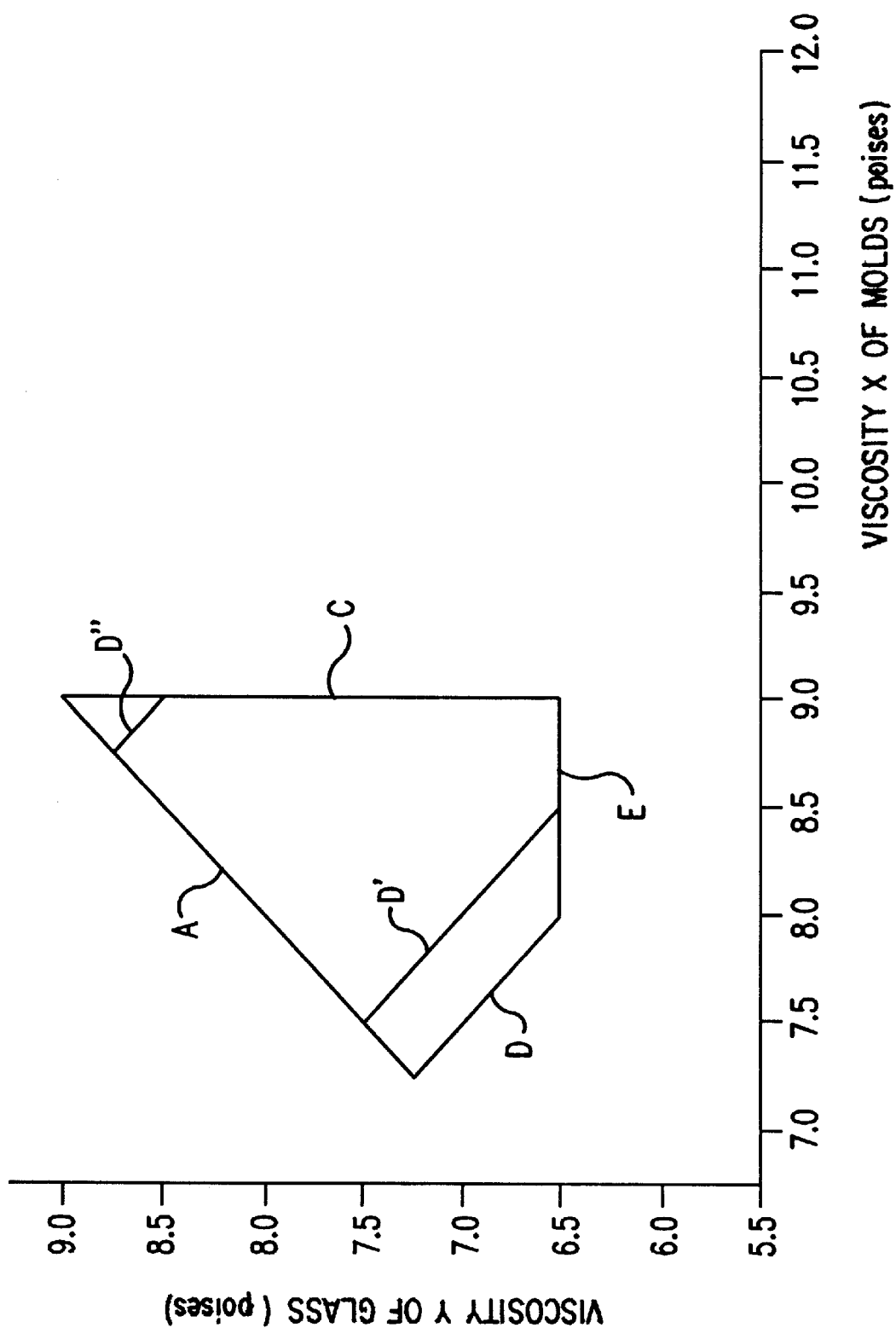
FIG. 11 is a graph for explaining a first method according to the invention.

The fourth method of the invention is a method to make possible manufacturing optical elements having property not easy to be expanded when press-molded and hardly with good surface precision, specially such as concave meniscus lenses. From the same reason as the second method, when the average temperature of the temperature around the molding surface of the upper mold and the temperature around the molding surface of the lower mold of the mold and the temperature of the glass molding material are indicated on the basis of logarithm of viscosity (poises) of the corresponding glass molding material, it is required to be in an area enclosed by Lines A, C, D, and E in FIG. 11. However, with the fourth method, since the method has a purpose to manufacture optical elements having property not easy to be expanded when press-molded and hardly with good surface precision, the preheat temperature of the mold is equal to or higher than a temperature that the viscosity of the glass molding material indicates $10^{9.0}$ poises (log X≦9.0, left side of Line C in FIG. 11).

In a case where a glass molding material such as a concave meniscus is press molded, it is preferable to perform a secondary pressing. However, if the temperatures of the glass molding material and the mold become too high, the glass molding material becomes too soft and expanded too much, thereby making difficult thickness control at the secondary pressing. The glass molding material also easily adheres to the mold, so that the mold is easily inflicted with damages to shorten the life of the mold. It is therefore required to set the glass molding material and the mold at a prescribed temperature or lower. When this temperature relation is indicated on the basis of a common logarithm of viscosity of the glass molding material, it is log X+log Y≧14.5 (upper side of Line D in FIG. 11). Moreover, it is more preferable that the temperature relation between the glass molding material and the mold is $17.5 \geq \log X + \log Y \geq 15$ (upper side of Line D' and lower side of Line D" in FIG. 11).

In regard with the preheat temperature of the upper and lower molds of the mold, when the temperature around the molding surface of the upper mold is set 5 to 40° C., or more preferably, 5 to 25° C. lower than the temperature around the molding surface of the lower mold, the glass molding material can be smoothly released from the mold after molding.

In this molding method of the invention, the glass material softened by heat is initially pressed for 1 to 20 seconds in the preheated mold. When this initial pressing is less than 2 seconds, the glass would not be expanded adequately, so that the glass material cannot be formed in a desired shape. The surface precision may be more improved as the initial pressing becomes longer, but if too long, the cycle time cannot be shortened, and the life of the mold may be affected. The upper limit may be 20 seconds. The molding pressure can be properly determined in consideration with the temperatures of the glass material and the mold, and the like, and it is generally proper to set the pressure in a range of 30 to 300 kg/cm$^2$.

As described above, in this invention, the press molding starts where the temperature of the mold is made lower than the temperature of the glass molding material (X>Y, or where the temperatures of the mold and the glass molding material are not equal). After the press molding starts, the glass molding material and the mold are cooled down in shrinking the temperature differences.

At that time, the cooling is automatically or manually performed at the same time of the start of the pressing (initial pressing), or during the pressing, or after completion of the initial pressing. As a result of such cooling, the mold and the glass molding material can be cooled down to a viscosity that the mold can release the glass molding material.

It is preferable to cool down the vicinity of the molding surface of the mold at a cooling rate of 20° C./min or more at the same time of the start of the initial pressing, or during the initial pressing, or after completion of the initial pressing. The cooling rate can be slower than 20° C./min, but the slower rate makes the cycle time longer unnecessarily. It is preferable, from a viewpoint to achievement of higher surface precision, to cool the vicinity of the molding surface at a rate of 20 to 180° C./min, though the rate may vary depending on size and shape of the glass molded articles.

Making a secondary pressing, which is done with a pressure lower than the initial pressing, during cooling after the initial pressing and cooling the vicinity of the molding surface in keeping this pressure are preferred from viewpoints that good surface precision can be obtained without creating sink marks and distortions on the surface shape and that the center thickness can also be maintained within a permissive margin. Such a secondary pressing is preferably implemented at 10 to 100 kg/cm$^2$ or 0.001 to 1 kg/cm$^2$, or 10 to 100 kg/cm$^2$ in the first half and 0.001 to 1 kg/cm$^2$ in the second half.

Implementing the initial pressing such that the center thickness of the glass 5 material softened by heat comes in a range of 0.3 mm smaller and 0.15 mm larger of the center thickness of the final product and then the secondary pressing is preferred from a viewpoint to keep the center thickness of the final products within a permissive margin. That is, because in the secondary pressing the pressure is quickly reduced in comparison with the initial pressing and the glass has a high viscosity, the center thickness is transformed with pressure by only around 0.001 to 0.12 mm, and therefore, the final center thickness is easily entered in a margin range of ±0.03 mm.

In the initial and secondary pressings, it is preferable to stop implementing the initial pressing for the glass material softened by heat by stopping means for stopping pressing so as to obtain a desired thickness in a range of 0.3 mm smaller and 0.15 mm larger of the center thickness of the final product, and to start the secondary pressing before or at the same time of the stop of the initial pressing, from viewpoints that the center thickness of the final product is guaranteed and that the surface precision is never impaired because the pressing is continuous between the initial pressing and the secondary pressing.

When a desired center thickness is gained by means of an external stopper mechanism or the like, and when a secondary pressing is further made, a good surface precision may not be obtained since pressing is interrupted momentarily. The initial pressing and the secondary pressing are preferably done by means of a double cylinder mechanism. Such a double cylinder mechanism will be described more in the following embodiments.

The glass molded article having press molded and cooled down is released from the mold after the temperature around the molding surface falls down at a temperature that the viscosity of the glass material corresponds to $10^{12}$ poises or below. If the glass viscosity exceeds $10^{12}$ poises, the viscous flowing would not occur within a short period, and the glass can be deemed as almost solidified. Consequently, the glass molded article would not be suffered from deformations or the like after mold releasing, and the article can obtain a good surface precision. The cooled glass molded article is released from the mold after having a temperature indicating the viscosity of $10^{12}$ or more. If the glass viscosity is equal to or more than $10^{12}$ poises, the viscous flowing would not occur within a short period, and the glass can be deemed as almost solidified. Consequently, the glass molded article would not be suffered from deformations or the like after mold releasing, and the article can obtain a good surface precision. When the temperature around the molding surface is a temperature corresponding to a viscosity of $10^{12}$ poises or more, the glass is deemed as having a viscosity of $10^{12}$ poises or more, so that the glass molded article can be released from the mold.

Figure 5:
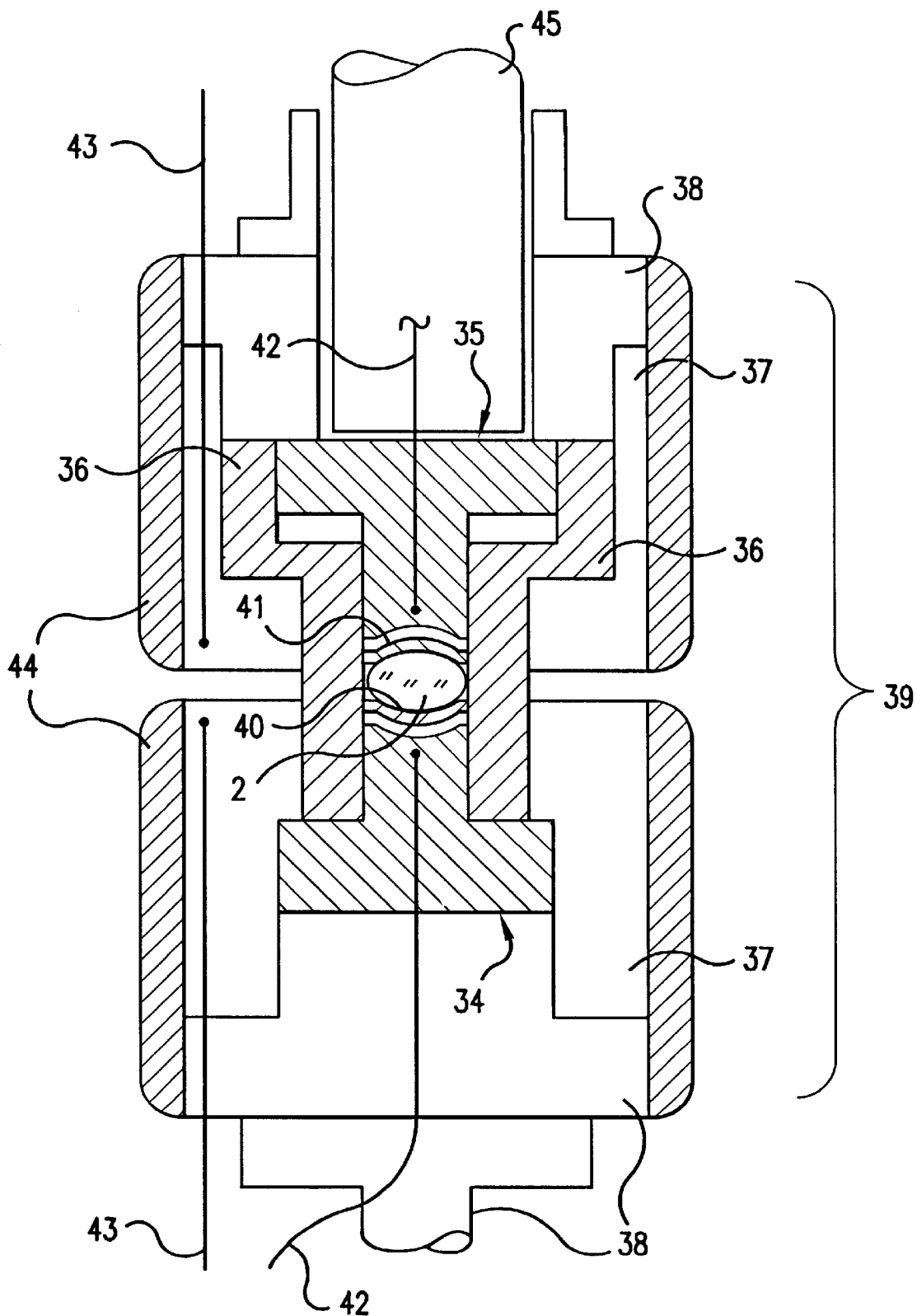
FIG. 5 is a schematic illustration showing a press-molding with the mold used in this invention.

Particularly, the glass molded article is preferably released from the mold where the temperature around the molding surface is in a range from the transition point of the glass material to the transition point −50° C. As a mold used for this invention, conventionally known molds can be used as they are, and for example, a mold 39 constituted of an upper mold 35, a lower mold 34, and a guide mold 36 as shown in FIG. 5 can be used. The mold for the invention is, however, not limited to those. As a mold, silicon carbide, silicon, silicon nitride, tungsten carbide, cermet such as aluminum oxide and titanium carbide, or those covered with diamond, refractory metal, noble metal alloy, or ceramic such as carbide, nitride, boride, oxide, or the like can be used. Particularly, a silicon carbide film is formed on a sintered silicon carbide by the CVD method, and after the item is fabricated in a final form, a carbon film made of a single component layer or mixed layer made of an amorphous film such as an i-carbon film and/or a crystal graphite and/or diamond is preferably formed by an ion plating method or the like. The reason is that the carbon film may not melt and adhere even if used for molding where the mold temperature is relatively high and that the carbon film can easily release the mold at a relatively high temperature because of well mold releasing property thereof.

To heat the mold, a resistance heater, a microwave (or high frequency) heater, or an infrared lamp heater, etc. can be used. For shortening the restoring time of the mold temperature, the microwave heater and the infrared lamp heater are preferable. Cooling of the mold can be done by cooling upon electric power stop or cooling gas communicating through the mold inside.

With the molding method of the invention, the glass material can be softened by heat while the glass material itself is floated by airflow, and the softened glass material is transferred to the preheated mold.

In a low viscosity area such that the glass material is transformed by its weight, it is very hard to prevent the jig for holding the glass material and the glass from adhering to each other during the heating. To solve this, the glass material is floated by airflow upon blowing gas from the inside of the jig, thereby forming a gas layer between the jig surface and the glass opposing faces. Consequently, softening by heat can be made without any reaction between the jig and the glass. Furthermore, when the glass material is a preform, the preform can be softened by heating while the shape of the preform is maintained. When the glass material is a glass gob and even where the gob is in an irregular shape and has some surface defects such as wrinkles on the surface, the shape can be regulated and the surface defects can be eliminated, by floating the glass by airflow while the glass is softened by heating.

In this invention, as a gas constituting airflow used for floating the glass material, there is no special limitation. From a viewpoint that the heated glass material does not react with the jig and that the jig is prevented from becoming impaired due to oxidization, the gas is preferably a non-oxidizing gas, and properly, e.g., nitrogen or the like. A reduction gas such as hydrogen gas or the like can added.

The flow amount of the airflow can be changed properly in consideration with the shape of the opening out of which airflow blows and the shape and weight of the glass material, etc. In a normal situation, a suitable gas flow amount for floating the glass material is in a range of 0.005 to 20 liters/min. If the gas flow amount is less than 0.005 liters/min, the glass material may not be floated adequately when the glass material has its weight of 300 mg or more. If the gas flow amount exceeds 20 liters/min, glass over the floating jig largely swings even where the glass has its weight of 2000 mg or more, and where the glass material is a preform, the shape may be changed during heating.

Figure 2:
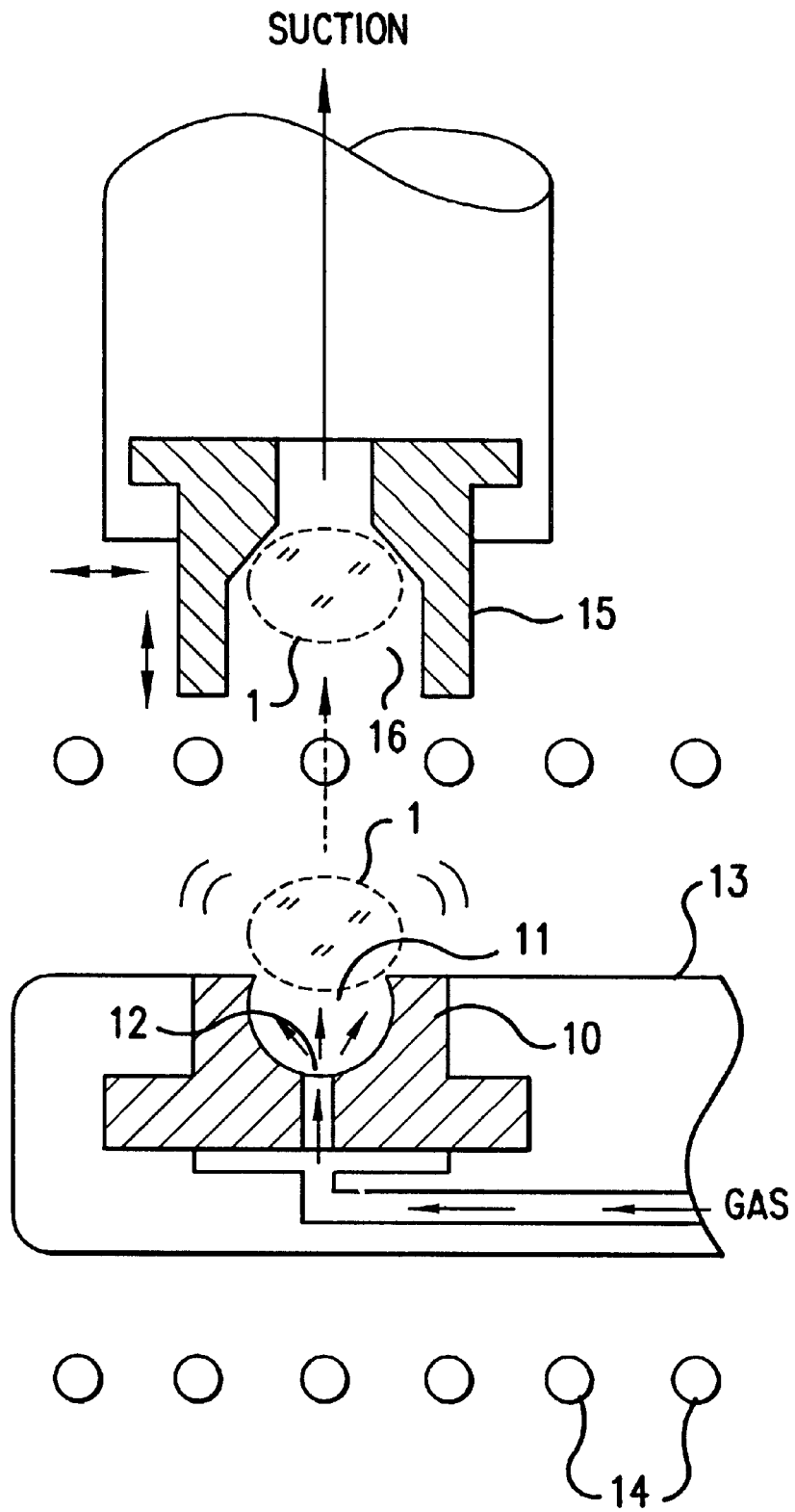
FIG. 2 is a schematic illustration showing a method for softening while floating and transferring a glass preform over a floating jig used in this invention.
Figure 6:
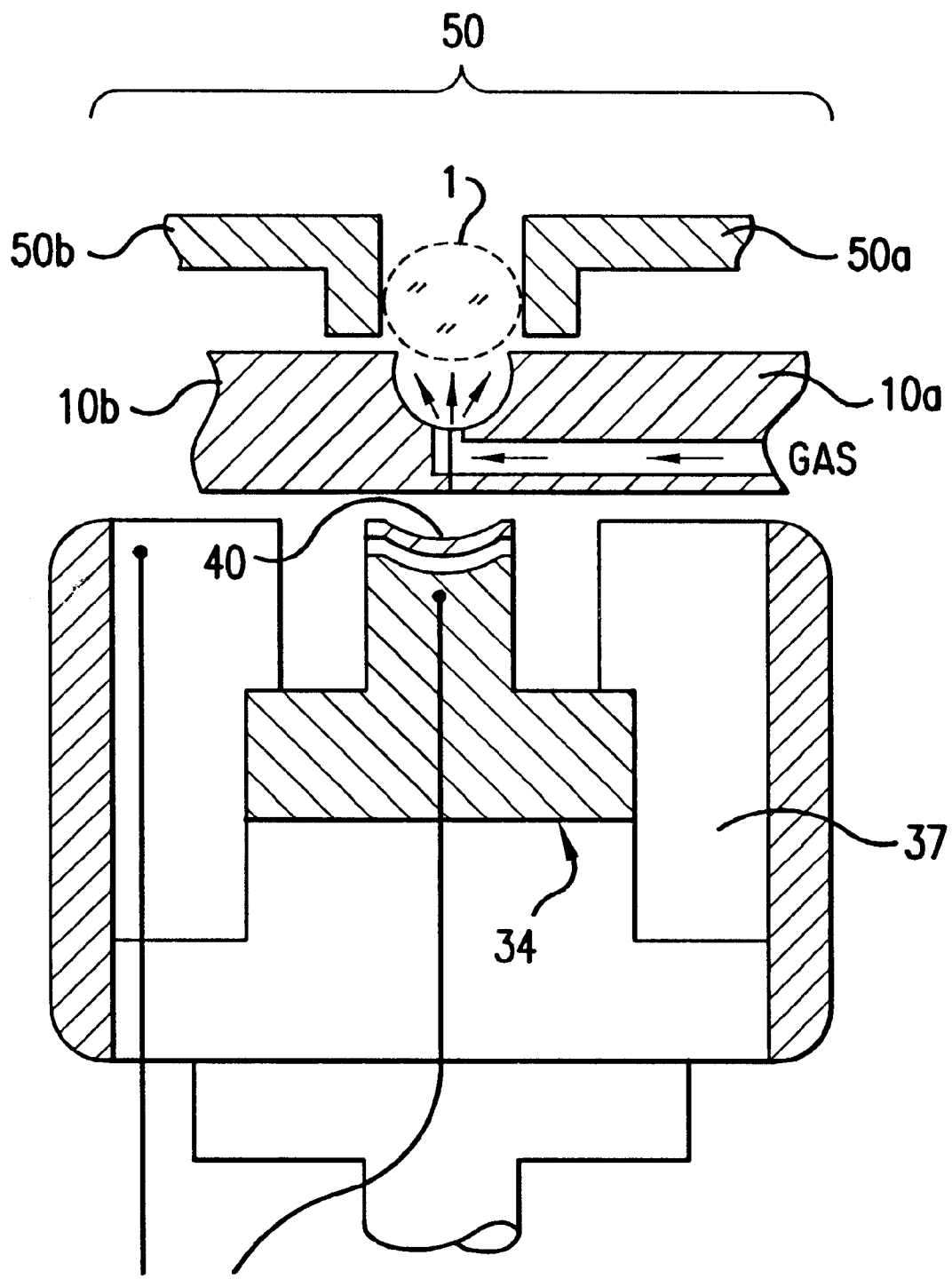
FIG. 6 is a schematic illustration showing a method for transferring the softened glass preform to a mold.

Floating by airflow of the glass material can be done by, e.g., airflow blowing upward from an upper opening having a diameter smaller than that of the glass material. As shown in FIG. 2, an upper opening 11 of a floating jig 11 supported by a floating jig support 13 has a diameter smaller than the diameter of the glass material, and the airflow blows out upward from a bottom 12 of the upper opening 11 of the floating jig 10, floats the glass material 1 over the upper opening 11, and holds it as not to contact with the floating jig 10. The glass material 1 is heated by heaters 14 for softening glass arranged around the opening. The floating jig 10 may have a separable structure that can be divided into two parts (shown by reference numbers 10a, 10b) as shown in FIG. 6.

Figure 3:
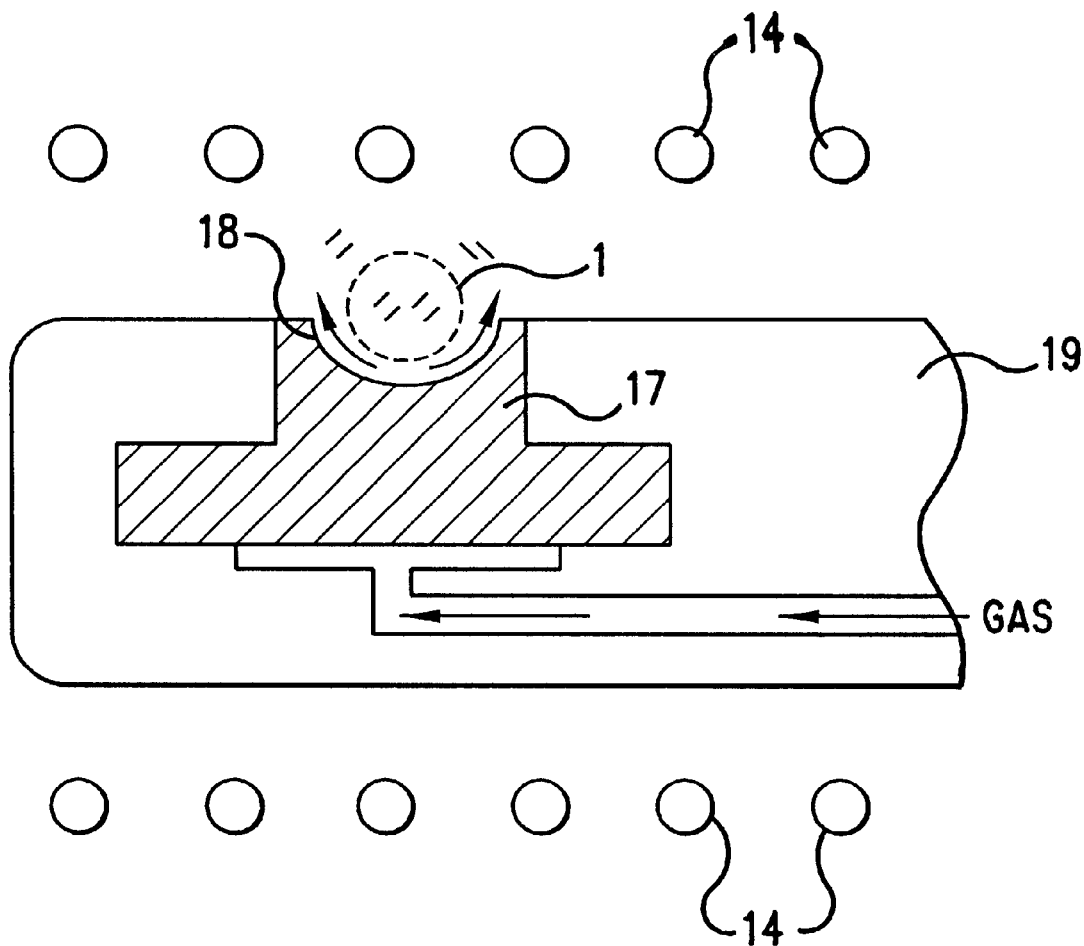
FIG. 3 is a schematic illustration showing a method for softening while floating a glass preform over a floating jig used in this invention.

Such floating by airflow of the glass material can also be done by airflow blowing out of a porous surface, which is a straight or curving surface approximate to the curvature of the outer diameter of the glass material. Particularly, when the glass material is a preform, it is effective because the shape of the preform can be maintained very easily. When the glass material is a glass gob, surface defects on the glass gob may be eliminated by heating in floating the gob by airflow from the porous surface. For example, as shown in FIG. 3, the glass material 1 is held in a floating state by airflow blowing out of a porous surface 18 over a floating jig 17 supported by a floating jig support 19 having the porous surface 18 having a spherical surface approximate to the curvature of the glass material 1. The floating jig support 19 and the floating jig 17 can have separable structures in the same way as shown in FIG. 6.

Heating of the glass material includes situations of heating from a normal temperature to a prescribed temperature, using the glass material heated at a certain temperature and further heating it, and using the glass material already heated at a prescribed temperature. For example, where the glass material is a glass gob, the glass gob produced from a melting glass can be used without cooling it.

Transfer of the glass material softened by heat to the preheated mold can be done by, e.g., holding the glass molding material in sucking it, or dropping the softened glass material.

Holding of the glass material by sucking the material can be done by, for example, a sucking apparatus 15 having a movable lower opening 16 as shown in FIG. 2. The lower opening 16 is in communication with, e.g., a pressure reduction pump, vacuums pump or the like, sucking air inside, so that the glass material can be sucked at the lower opening 16. The glass material 1 softened by heat over the floating jig 10 is held by sucking by means of the movable lower opening 16 of the sucking apparatus 15 and is transferred as shown in FIG. 4 to a space over the molding surface 40 of the lower mold 34 of the mold. The softened glass material 1 is subsequently press-molded as shown in FIG. 5 with a molding surface 40 of a lower mold 34 and a molding surface 41 of an upper mold 35, and thereby a glass molded article 2 can be obtained.

Transfer of the glass material softened by heat can be done by dropping the glass material. Dropping the glass material can be done by, e.g., dividing the floating jig used for heating the glass material into two or more parts to open a lower portion of the jig. For example, as shown in FIG. 6, the glass material 1 is heated above the floating jig 10 to soften the glass material 1, and then, the floating jig 10 is horizontally divided into two parts 10a, 10b to drop the glass material 1 by moving the parts in the opposite way (right and left in FIG. 7) to each other. By providing the lower mold 34 of the mold as a reception of the dropping glass material 1 at that time, the glass material 1 can be transferred onto the molding surface 40 of the lower mold 40.

Figure 7:
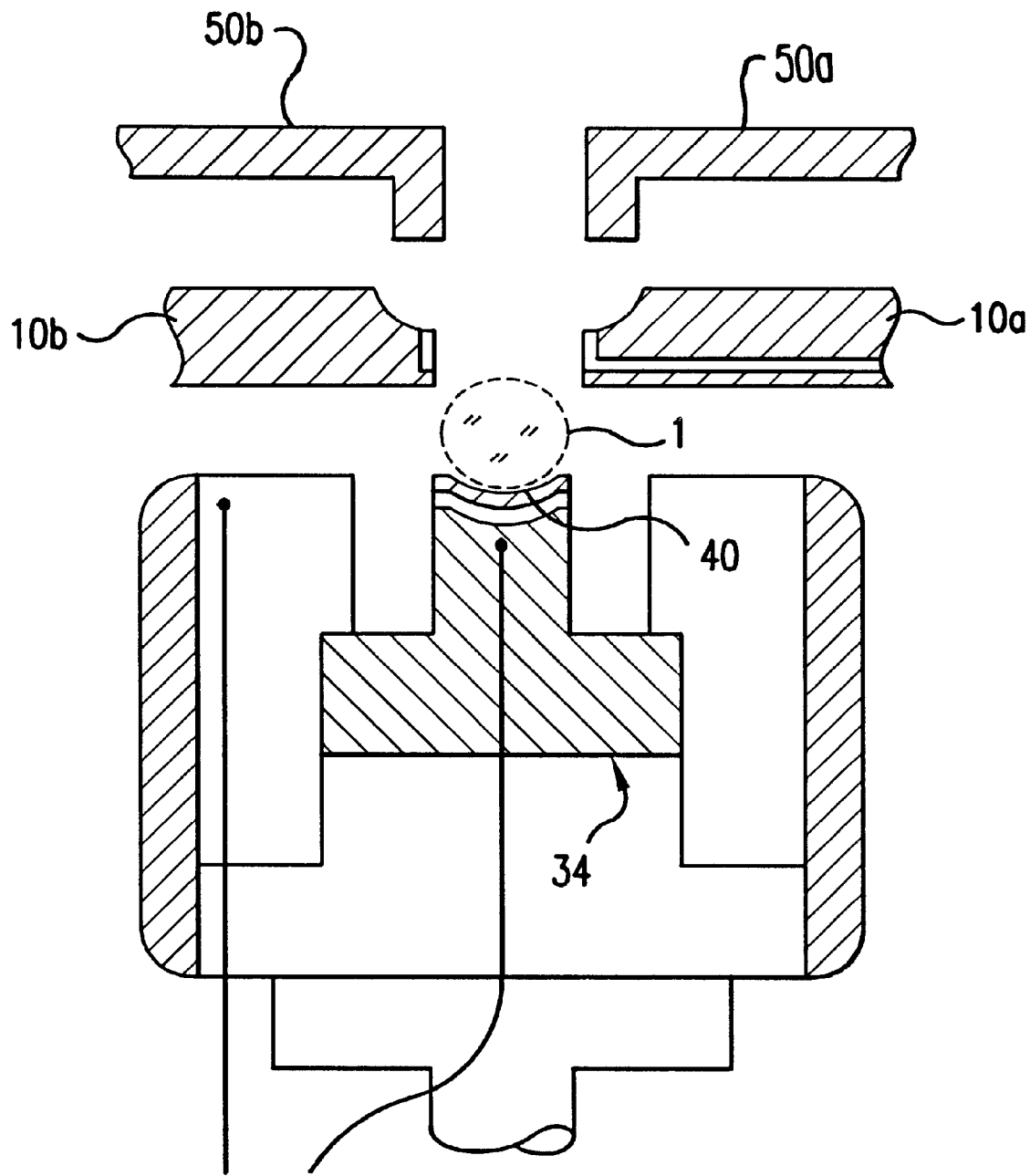
FIG. 7 is a schematic illustration showing a method for transferring the softened glass preform to a mold.

With this invention, guide means can be used for moving the glass material softened by heat in dropping the material onto a prescribed molding surface. For example, as shown in FIGS. 6, 7, a guide means 50 (constituted of separable parts 50a, 50b) in a cylindrical form having an inner diameter that can keep a proper clearance with the most outer diameter of the glass material 1 is arranged over the floating jig 10, thereby being capable of dropping the glass material 1 to the center of the mold. For the guide means, there is no specific limitation on the structure thereof as far as the means can prevent the glass material from positionally shifting during moving upon separation of the floating jig. For example, the means can be, not only a device in the cylindrical shape, but also multiple pipes arranged in a grid form or opposing two or more plates. The guide means may have a structure movable and separable in consideration with a method that during molding the upper mold moves to a space over the lower mold holding the glass material to press-mold the glass material.

There is no special limitation on a method for separation and moving of the floating jig used for heating the glass material. For example, when the floating jig moves horizontally as described above, the floating jig can be divided into three or four parts and move in three directions (each 120 degree different) or four directions (each 90 degree different), thereby dropping the glass material. By dropping the glass material softened by heat, the glass material can be transferred in the mold in a short time.

The manufacturing method of the invention is applicable to optical elements, such as gratings, fiber guide blocks, and the like, in addition to lenses and prisms.

Embodiments

This invention will further be described more specifically using embodiments.

Embodiment 1

Mold for Press Molding

A mold for press molding was made as shown in FIG. 1 in use of a silicon carbide (SiC) sintered material 31 as a substrate material, and a substrate for mold was obtained by forming a silicon carbide film 32 by a CVD method on a molding surface side after the material 31 was fabricated in a mold shape through grinding and further by finishing the material to a mirror surface having a shape corresponding to a glass molded article to be manufactured through grinding and polishing. A lower mold 34 for lenses having a diameter of 16 mm (diameter 14 mm after centering) was obtained in having a molding surface 40 covered with i-carbon (diamond like carbon) film 33 made by an ion plating method on the silicon carbide film 32 of the mold substrate.

A upper mold 35 shown in FIG. 5 was also obtained in the same manner as the lower mold 34. The upper mold 35 and the lower mold 34 are set coaxially as shown in FIG. 5, and a mold 39 are constituted of the upper mold 35, the lower mold 34, and a guide mold 36 for guiding the molds when press-molding. A pushing bar 45 for secondary pressing is mounted above a top face of the upper mold 35.

The lower and upper molds 34, 35 are heated by a mold heater 44 arranged at the outer periphery of the shell block 37, and heating is controlled by a thermocouple 42 for measuring mold temperature inserted in the lower mold 34 from a bottom of a mold support 38. The temperature of the shell block 37 is measured by a thermocouple 43 inserted in the shell block 37.

Floating jig and transfer means

A floating jig and a transfer means shown in FIG. 2 are also formed in the same closed chamber (not shown) having the above mold heating mechanism.

The floating jig is formed with a glass softening heater 14 for softening the glass material (preform) 1 by heat, and a glassy carbon floating jig 10 (hereinafter referred to as "GC floating jig") set to a floating jig support 13 is arranged within the glass softening heater 14. The glass material 1 is held as floating by blowing 98% $N_2$+2% $H_2$ gas or $N_2$ gas supplied to the bottom of the GC floating jig 10 from the inside of the floating jig support 13.

A glassy carbon vacuum pad 15 (hereinafter referred to as "GC vacuum pad") movable in vertical and horizontal directions is formed outside the glass softening heater 14 and is normally waiting over the GC floating jig 10.

Preheating and pressing process

After the closed chamber (not shown) containing the mold and the floating jig was vacuumed, the 98% $N_2$+2% $H_2$ gas or $N_2$ gas was introduced in the chamber to fill the closed chamber with the same gas.

Subsequently, using a preform 1 (hot molded product in an echinus shape having a mirror surface free of surface defects, weight 1000 mg, thickness 7 mm, transition point 514° C., a sag point 545° C.) made of a barium borosilicate optical glass, convex meniscus lenses and concave meniscus lenses were manufactured. The results are shown in Table 1.

TABLE 1

| | | | Logarithm indication of average viscosity (poises) when pressing starts | |
|---|---|---|---|---|
| No. | Lens shape | Glass | Average of upper and lower molds * | Temperature difference between upper and lower molds (C°) |
| 1 | convex meniscus | 8.7 | 9.3 | 0 |
| 2 | convex meniscus | 8.2 | 9.8 | 10 |
| 3 | convex meniscus | 8.4 | 9.1 | 5 |
| 4 | convex meniscus | 7.7 | 9.8 | 15 |
| 5 | convex meniscus | 7.0 | 9.8 | 20 |
| 6 | concave meniscus | 7.9 | 8.3 | 10 |
| 7 | concave meniscus | 7.5 | 8.7 | 10 |
| 8 | concave meniscus | 6.5 | 9.8 | 10 |
| 9 | concave meniscus | 7.0 | 8.7 | 10 |
| 10 | convex meniscus | 7.3 | 7.7 | 10 |
| 11 | convex meniscus | 7.0 | 8.0 | 10 |
| 12 | convex meniscus | 6.5 | 8.7 | 10 |
| 13 | convex meniscus | 7.0 | 7.5 | 10 |
| 14 | convex meniscus | 6.5 | 8.0 | 10 |

* Mold temperature is indicated upon converted to corresponding viscosity of glass.

| No. | Pressure of initial pressing (kg/cm²) | Time of initial pressing (sec) | Pressure of pressing during cooling (kg/cm²) | Cooling rate (° C./min) | Mold-releasing temperature (° C.) |
|---|---|---|---|---|---|
| 1 | 200 | 15 | 70 | 150 | 470 |
| 2 | 200 | 10 | 50 | 100 | 500 |
| 3 | 100 | 10 | 30 | 100 | 480 |
| 4 | 200 | 5 | 50 | 50 | 510 |
| 5 | 100 | 10 | 20 | 100 | 490 |
| 6 | 200 | 6 | 1st half 60, 2nd half 0.1 | 30 | 490 |
| 7 | 200 | 3 | 1st half 60, 2nd half 0.1 | 50 | 490 |
| 8 | 100 | 10 | 1st half 20, 2nd half 0.1 | 50 | 490 |
| 9 | 70 | 10 | 1st half 20, 2nd half 0.1 | 30 | 490 |
| 10 | 80 | 3 | 0.1 | 100 | 500 |
| 11 | 80 | 3 | 0.1 | 100 | 500 |
| 12 | 80 | 3 | 0.1 | 100 | 500 |
| 13 | 40 | 4 | 0.1 | 100 | 500 |
| 14 | 40 | 4 | 0.1 | 100 | 500 |

Temperatures (mold temperatures) at positions 1 mm inside from the molding surfaces of the upper and lower molds 35, 34, which are measured by thermocouples 43 for measuring mold temperature, are heated up to a temperature corresponding to the glass viscosity shown in Table 1 and held at that temperature.

Meanwhile, the temperature of the glass preform 1 over the GC floating jig 10 is heated by the glass softening heater 14 up to a temperature corresponding to the glass viscosity shown in Table 1 and softened as floating.

Relation between the glass viscosity and the temperature is as follows: Relation between viscosity and temperature

| Glass viscosity | Temperature |
|---|---|
| $10^{6.5}$ poises | 647° C. |
| $10^{7}$ poises | 628° C. |
| $10^{7.3}$ poises | 618° C. |
| $10^{7.5}$ poises | 611° C. |
| $10^{7.7}$ poises | 605° C. |
| $10^{7.9}$ poises | 599° C. |
| $10^{8}$ poises | 596° C. |
| $10^{8.2}$ poises | 590° C. |
| $10^{8.3}$ poises | 588° C. |
| $10^{8.4}$ poises | 585° C. |
| $10^{8.7}$ poises | 578° C. |
| $10^{9.1}$ poises | 569° C. |
| $10^{9.3}$ poises | 565° C. |
| $10^{9.8}$ poises | 556° C. |

Then, the GC vacuum pad 15 waiting above the GC floating jig 10 outside the glass softening heater 14 moves down to the preform 1 softened by heat and holds in sucking the preform 1. At that time, though the temperature of the GC vacuum pad is heated at 300 to 400° C. by radiated heat from the glass softening heater 14, the glass does not adhere since it is of a low temperature.

Next, as shown in FIG. 4, the GC vacuum pad 15 holding the preform 1 moves quickly up to a space over the lower mold 34 and stops sucking at the same time when moving down around the molding surface 40 of the lower mold 34 to mount the preform 1 on the molding surface 40 of the lower mold 34. Since the GC vacuum pad 15 then goes upward over the lower mold 34 and returns to the original waiting position, no blockage exists over the lower mold 34, and the mold support 38 lifts in a moment the lower mold 34 up to the upper mold 35, which is immovably set with the mold support 38 coaxially with and over the lower mold 34.

As shown in FIG. 5, in the mold 39 constituted of the upper and lower molds 35, 34 and the guide mold 36 for guiding the molds, the preform 1 is press-molded with pressure and time shown in Table 1, and when a flange portion of the lower mold 34 and the bottom surface of the guide mold 36 come in contact with each other, the glass is made to have a thickness 30 microns lager than the thickness of the final product. The mold heater 44 is powered off, thereby cooling the glass with cooling rate shown in Table 1. In a meantime, the pushing bar 45 connected to the second cylinder located inside the first cylinder presses the glass molded article 2 and the mold 39 with pressure as shown in Table 1 at the same time when the first cylinder stops pressing from the back of the upper mold 35.

When the temperatures of the upper and lower mold 35, 34 measured by the thermocouples 42 for measuring mold temperature become temperatures indicated as mold releasing temperatures in Table 1, and when the glass molded article 2 has a prescribed thickness, the glass molded article 2 is released from the mold 39.

Relation between the glass viscosity and the temperature is noted as described above.

Where specifications of glass molded article 2 thus obtained (Table 1) (convex meniscus lenses of outer diameter 16 mm, center thickness 2.6 mm, and edge thickness 1.0 mm, and concave meniscus lenses of outer diameter 15 mm, center thickness 1.3 mm, edge thickness 3.0 mm) after annealing were evaluated with respect to surface precision measured by an interferometer, appearance when seen by naked eyes, and surface condition by a microscope, any lens had irregularity less than one line and good surface quality.

Embodiment 2

Convex meniscus lenses and concave meniscus lenses were manufactured in the same way as Embodiment 1 except use of a spherical shape instead of the echinus shape. The preform used at that time was made of the same glass specie and a spherical hot molded product having a weight of 1000 mg, a diameter of 8.742 mm, a mirror surface free from surface defects. Manufacturing conditions are shown in Table 2.

TABLE 2

| | | Logarithm indication of average viscosity (poises) when pressing starts | | |
|---|---|---|---|---|
| No. | Lens shape | Glass | Average of upper and lower molds * | Temperature difference between upper and lower molds (C°) |
| 1 | Concave meniscus | 7.5 | 8.7 | 10 |
| 2 | Concave meniscus | 7.0 | 8.7 | 10 |
| 3 | Convex meniscus | 7.3 | 7.7 | 10 |
| 4 | Convex meniscus | 7.0 | 8.0 | 10 |
| 5 | Convex meniscus | 6.5 | 8.7 | 10 |
| 6 | Convex meniscus | 7.0 | 7.5 | 10 |
| 7 | Convex meniscus | 6.5 | 8.0 | 10 |

* Mold temperature is indicated upon converted to corresponding viscosity of glass.

| No. | Pressure of initial pressing (kg/cm²) | Time of initial pressing (sec) | Pressure of pressing during cooling (kg/cm²) | Cooling rate (° C./min) | Mold-releasing temperature (° C.) |
|---|---|---|---|---|---|
| 1 | 200 | 3 | 1st half 60, 2nd half 0.1 | 50 | 490 |
| 2 | 70 | 10 | 1st half 20, 2nd half 0.1 | 30 | 490 |
| 3 | 80 | 3 | 0.1 | 100 | 500 |
| 4 | 80 | 3 | 0.1 | 100 | 500 |
| 5 | 80 | 3 | 0.1 | 100 | 500 |
| 6 | 40 | 4 | 0.1 | 100 | 500 |
| 7 | 40 | 4 | 0.1 | 100 | 500 |

Where specifications of glass molded article thus obtained (Table 2) (convex meniscus lenses of outer diameter 16 mm, center thickness 2.6 mm, and edge thickness 1.0 mm, and concave meniscus lenses of outer diameter 15 mm, center thickness 1.3 mm, edge thickness 3.0 mm) after annealing were evaluated with respect to surface precision measured by an interferometer, appearance when seen by naked eyes, and surface condition by a microscope, any lens had irregularity less than one line and good surface quality.

Embodiment 3

Figure 12:
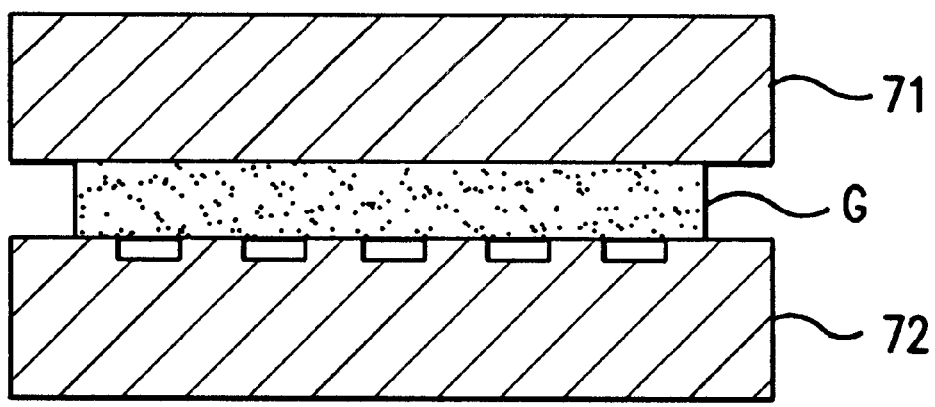
FIG. 12 is a schematic illustration showing a method for manufacturing optical elements in a third embodiment.

After polishing was made to form a flat surface, a glass molding material polished to have a flat surface is placed between a disc-shaped lower mold whose surface has fine grooves of a width 1 micron and a depth 0.1 micron and an upper mold polished to have a flat surface. After the glass molding material was softened by heater above the lower mold, the material was press-molded by the upper and lower molds to create an article to which fine patterns were transferred having an outer diameter of 50 mm (see, FIG. 12). Molding conditions were the same as No. 9 in Table 1.

In this embodiment, the cycle time for press molding is the total of molding time and resuming time of the mold temperature (time for increasing temperature from the temperature at mold releasing to the temperature when molding starts). With this embodiment, a resistance heater was used for heating the mold, so that the resuming time was about 50 seconds. Accordingly, the cycle time was about 100 to 250 seconds.

Use of high frequency heating or infrared heating for heating the mold allows the resuming time to become about 20 seconds, and the cycle time can be shortened by that portion.

The molding method according to the invention can shorten the cycle time for press-molding even though it is a press for high precision, because the pressing is made upon preheating the mold and the glass molding material to a prescribed temperature in advance as to keep the temperature (viscosity) of the glass molding material and the temperature of the mold a constant relation when press-molding is made.

Particularly, with the molding method of the invention, the glass molding material is pressed so that the center thickness of the glass molded article becomes 70% or less of the center thickness of the glass molding material under above temperature conditions for the glass molding material and the mold, so that even where the glass material having a largely different shape from the final product is transformed largely by press-molding, glass optical elements can be manufactured having better surface precision than conventional products with a relatively short cycle time.

According to the invention, since the glass molding material is transferred to the pressing process in a state that the glass molding material is softened by heat while floated by airflow, the surface of the glass material is completely isolated from receiving damages, and glass optical elements can be manufactured in having better surface precision.

What is claimed is:

1. A method for manufacturing glass optical elements comprising:
    softening a glass molding material by heating the glass molding material to obtain a softened glass molding material at a temperature corresponding to a glass molding material viscosity of Y poises,
    adjusting the temperature of a lower mold molding surface and the temperature of a upper mold molding surface to obtain an average temperature of the molding surfaces corresponding to a glass molding material viscosity of X poises, wherein X and Y satisfy the conditions: $\log(X)<10$, $\log(Y)\geq 6.5$, $Y<X$, and $-\log(X)+14.5 \leq \log(Y) \leq -\log(X)+18$,
    introducing the softened glass molding material into a mold comprising an upper mold having said upper mold molding surface and a lower mold having said lower mold molding surface,
    and press molding the softened glass molding material to obtain a press molded article having a center thickness of 70% or less of a center thickness of the glass molding material.

2. The method for manufacturing glass optical elements according to claim 1, wherein the press molding of the glass molding material is conducted until the center thickness of the glass molded article becomes 50% or less of the center thickness of the glass molding material.

3. The method for manufacturing glass optical elements according to claim 1, wherein the average temperature of the respective molding surfaces of the upper and lower molds is 10° C. or more lower than the temperature of the glass molding material.

4. The method for manufacturing glass optical elements according to claim 1, wherein the temperature of the molding surface of the upper mold is 5 to 40° C. lower than the temperature of the molding surface of the lower mold.

5. The method for manufacturing glass optical elements according to claim 1, wherein a vicinity of the molding surface of the mold is cooled down at a cooling rate of 20 to 180° C./min.

6. The method for manufacturing glass optical elements according to claim 1, further comprising cooling the glass molding material after the press molding, and during said cooling, conducting a secondary pressing of the glass molding material at a secondary pressing pressure lower than a press molding pressure, wherein said secondary pressing pressure is from 10 to 100 k g/cm$^2$ or from 0.001 to 1 kg/cm$^2$.

7. The method for manufacturing glass optical elements according to claim 1, wherein the glass molding material is softened by heat while floated by gas stream.

8. The method for manufacturing glass optical elements according to claim 7, wherein introducing the softened glass molding material into the mold comprises holding the glass molding material upon sucking the glass molding material or dropping the glass molding material.

9. The method for manufacturing glass optical elements according to claim 8, wherein introducing the softened glass molding material into the mold comprises dropping the softened glass molding material by separating a floating jig for heating the glass material into two or more portions.

10. A method for manufacturing glass optical elements, comprising:
    softening a spherical glass molding material by heating the glass molding material to obtain a softened glass molding material at a temperature corresponding to a glass molding material viscosity of Y poises,
    adjusting the temperature of a lower mold molding surface and the temperature of a upper mold molding surface to obtain an average temperature of the molding surfaces corresponding to a glass molding material viscosity of X poises, wherein X and Y satisfy the conditions: $\log(X)<10$, $\log(Y)\geq 6.5$, $Y<X$, and $-\log(X)+14.5 \leq \log(Y) \leq -\log(X)+18$,
    introducing the softened glass molding material into a mold comprising an upper mold having said upper mold molding surfae and a lower mold having said lower mold molding surface, and
    press molding the softened glass molding material to obtain a press molded article.

11. The method for manufacturing glass optical elements according to claim 10, wherein the press molding of the glass molding material is conducted until the center thickness of the glass molded article becomes 50% or less of the center thickness of the glass molding material.

12. The method for manufacturing glass optical elements according to claim 10, wherein the average temperature of the respective molding surfaces of the upper and lower molds is 10° C. or more lower than the temperature of the glass molding material.

13. The method for manufacturing glass optical elements according to claim 10, wherein the temperature of the molding surface of the upper mold is 5 to 40° C. lower than the temperature of the molding surface of the lower mold.

14. The method for manufacturing glass optical elements according to claim 10, wherein a vicinity of the molding surface of the mold is cooled down at a cooling rate of 20 to 180° C./min.

15. The method for manufacturing glass optical elements according to claim 10, further comprising cooling the glass molding material after the press molding, and during said cooling, conducting a secondary pressing of the glass molding material at a secondary pressing pressure lower than a press molding pressure, wherein said secondary pressing pressure is from 10 to 100 kg/cm² or from 0.001 to 1 kg/cm².

16. The method for manufacturing glass optical elements according to claim 10, wherein the glass molding material is softened by heat while floated by gas stream.

17. The method for manufacturing glass optical elements according to claim 16, wherein introducing the softened glass molding material into the mold comprises holding the glass molding material upon sucking the glass molding material or dropping the glass molding material.

18. The method for manufacturing glass optical elements according to claim 17, wherein introducing the softened glass molding material into the mold comprises dropping the softened glass molding material by separating a floating jig for heating the glass material into two or more portions.

19. A method for manufacturing glass optical elements, comprising:
    softening a spherical glass molding material by heating the glass molding material to obtain a softened glass molding material at a temperature corresponding to a glass molding material viscosity of Y poises,
    adjusting the temperature of a lower mold molding surface and the temperature of a upper mold molding surface to obtain an average temperature of the molding surfaces corresponding to a glass molding material viscosity of X poises,
    introducing the softened glass molding material into a mold comprising an upper mold having said upper mold molding surface and a lower mold having said lower mold molding surface, and
    press molding the softened glass molding material to obtain a press molded article, wherein at the start of the press molding X and Y satisfy the conditions: $\log(X) < 10$, $\log(Y) \geq 6.5$, $Y < X$, and $-\log(X) + 14.5 \leq \log(Y) \leq -\log(X) + 18$, with the proviso that if $9.0 \leq \log(X) < 10$, then $\log(Y) > 7.0$.

20. The method for manufacturing glass optical elements according to claim 19, wherein the press molding of the glass molding material is conducted until the center thickness of the glass molded article becomes 50% or less of the center thickness of the glass molding material.

21. The method for manufacturing glass optical elements according to claim 19, wherein the average temperature of the respective molding surfaces of the upper and lower molds is 10° C. or more lower than the temperature of the glass molding material.

22. The method for manufacturing glass optical elements according to claim 19, wherein the temperature of the molding surface of the upper mold is 5 to 40° C. lower than the temperature of the molding surface of the lower mold.

23. The method for manufacturing glass optical elements according to claim 19, wherein a vicinity of the molding surface of the mold is cooled down at a cooling rate of 20 to 180° C./min.

24. The method for manufacturing glass optical elements according to claim 19, further comprising cooling the glass molding material after the press molding, and during said cooling, conducting a secondary pressing of the glass molding material at a secondary pressing pressure lower than a press molding pressure, wherein said secondary pressing pressure is from 10 to 100 kg/cm² or from 0.001 to 1 kg/cm².

25. The method for manufacturing glass optical elements according to claim 19, wherein the glass molding material is softened by heat while floated by gas stream.

26. The method for manufacturing glass optical elements according to claim 25, wherein introducing the softened glass molding material into the mold comprises holding the glass molding material upon sucking the glass molding material or dropping the glass molding material.

27. The method for manufacturing glass optical elements according to claim 26, wherein introducing the softened glass molding material into the mold comprises dropping the softened glass molding material by separating a floating jig for heating the glass material into two or more portions.

28. A method for manufacturing glass optical elements comprising:
    softening a glass molding material by heating the glass molding material to obtain a softened glass molding material at a temperature corresponding to a glass molding material viscosity of Y poises,
    adjusting the temperature of a lower mold molding surface and the temperature of a upper mold molding surface to obtain an average temperature of the molding surfaces corresponding to a glass molding material viscosity of X poises,
    introducing the softened glass molding material into a mold comprising an upper mold having said upper mold molding surface and a lower mold having said lower mold molding surface, and
    press molding the softened glass molding material to obtain a press molded article having a center thickness of 70% or less of a center thickness of the glass molding material, wherein at the start of the press molding X and Y satisfy the conditions:

$$\log(X) < 9,\ \log(Y) \geq 6.5,\ Y < X,$$

and $$\log(Y) \geq -\log(X) + 14.5.$$

29. A method for manufacturing glass optical elements according to claim 28, comprising:
    softening a spherical glass molding material by heating the glass molding material to obtain a softened glass molding material at a temperature corresponding to a glass molding material viscosity of Y poises,
    adjusting the temperature of a lower mold molding surface and the temperature of a upper mold molding surface to obtain an average temperature of the molding surfaces corresponding to a glass molding material viscosity of X poises,
    introducing the softened glass molding material into a mold comprising an upper mold having said upper mold molding surface and a lower mold having said lower mold molding surface, and
    press molding the softened glass molding material to obtain a press molded article having a center thickness of 70% or less of a center thickness of the glass molding material, wherein at the start of the press molding X and Y satisfy the conditions:

$$\log(X) < 9,\ \log(Y) \geq 6.5,\ Y < X,$$

and $$\log(Y) \geq -\log(X) + 14.5.$$

30. The method for manufacturing glass optical elements according to claim 29, wherein the press molding of the glass molding material is conducted until the center thickness of the glass molded article becomes 50% or less of the center thickness of the glass molding material.

31. The method for manufacturing glass optical elements according to claim 29, wherein the average temperature of the respective molding surfaces of the upper and lower molds is 10° C. or more lower than the temperature of the glass molding material.

32. The method for manufacturing glass optical elements according to claim 29, wherein the temperature of the molding surface of the upper mold is 5 to 40° C. lower than the temperature of the molding surface of the lower mold.

33. The method for manufacturing glass optical elements according to claim 29, wherein a vicinity of the molding surface of the mold is cooled down at a cooling rate of 20 to 180° C./min.

34. The method for manufacturing glass optical elements according to claim 29, further comprising cooling the glass molding material after the press molding, and during said cooling, conducting a secondary pressing of the glass molding material at a secondary pressing pressure lower than a press molding pressure, wherein said secondary pressing pressure is from 10 to 100 kg/cm$^2$ or from 0.001 to 1 kg/cm$^2$.

35. The method for manufacturing glass optical elements according to claim 29, wherein the glass molding material is softened by heat while floated by gas stream.

36. The method for manufacturing glass optical elements according to claim 35, wherein introducing the softened glass molding material into the mold comprises holding the glass molding material upon sucking the glass molding material or dropping the glass molding material.

37. The method for manufacturing glass optical elements according to claim 36, wherein introducing the softened glass molding material into the mold comprises dropping the softened glass molding material by separating a floating jig for heating the glass material into two or more portions.

* * * * *